(12) United States Patent
Blanco

(10) Patent No.: US 8,718,977 B2
(45) Date of Patent: May 6, 2014

(54) PORTABLE APPARATUS AND METHOD FOR TESTING AND CERTIFICATION OF LASER-BASED SPEED MEASURING DEVICES

(75) Inventor: David Blanco, Endicott, NY (US)

(73) Assignee: DBInnovations, LLC, Little Falls, NY (US)

( * ) Notice: Subject to any disclaimer, the term of this patent is extended or adjusted under 35 U.S.C. 154(b) by 720 days.

(21) Appl. No.: 12/788,345

(22) Filed: May 27, 2010

(65) Prior Publication Data

US 2010/0305904 A1 Dec. 2, 2010

Related U.S. Application Data

(60) Provisional application No. 61/182,288, filed on May 29, 2009.

(51) Int. Cl.
*G06F 11/30* (2006.01)
*G21C 17/00* (2006.01)

(52) U.S. Cl.
USPC .......................................................... 702/182

(58) Field of Classification Search
USPC .......................................................... 702/182
See application file for complete search history.

(56) References Cited

U.S. PATENT DOCUMENTS

| | | | | |
|---|---|---|---|---|
| 4,464,115 A | * | 8/1984 | Simpson et al. | 434/27 |
| 5,600,132 A | * | 2/1997 | Martinson et al. | 250/227.11 |
| 6,046,696 A | * | 4/2000 | Blanco | 342/171 |
| 8,165,838 B2 | * | 4/2012 | Kane et al. | 702/85 |
| 2003/0030571 A1 | * | 2/2003 | Trajkovic et al. | 340/902 |
| 2005/0118556 A1 | * | 6/2005 | Watanabe et al. | 434/22 |
| 2008/0100822 A1 | * | 5/2008 | Munro | 356/4.01 |

OTHER PUBLICATIONS

English Abstract of Chung et al. (KR 876602), Jan. 2009.*
Englisg Abstract of CN 201017476, Feb. 2008.*

* cited by examiner

*Primary Examiner* — Michael Nghiem
(74) *Attorney, Agent, or Firm* — William Greener; Bond, Schoeneck & King, PLLC

(57) ABSTRACT

A portable test and certification unit for laser-based speed measuring devices (e.g., traffic laser guns) is provided. The test and certification unit is capable of performing manual, semi-automatic and automatic measurements on laser guns, ensuring no "missed" steps in the certification process. The unit is optionally supported by a general-purpose digital computer such as a "PC," which may, in turn, record test results and print certification documents. The test and certification unit allows for fast and accurate certification of laser guns in a laboratory or in the field by operators of only minimal technical skill, thereby saving expense and time, as laser guns no longer must be removed from vehicles and/or shipped to a remote certification facility.

25 Claims, 26 Drawing Sheets

PORTABLE APPARATUS AND METHOD FOR TESTING AND CERTIFICATION OF LASER-BASED SPEED MEASURING DEVICES

RELATED APPLICATION DATA

The instant application claims priority to U.S. provisional application Ser. No. 61/182,288 filed on May 29, 2009, the subject matter of which is incorporated herein by reference in its entirety.

BACKGROUND

1. Field of the Invention

The field of the invention pertains to apparatus and methods used for laser-based speed measurement of moving objects. Non-limiting embodiments of the invention are directed to portable, modularized, and self-contained optoelectronic apparatus for testing and certifying the accurate operation of a laser-based speed measuring device (hereinafter, "laser gun"), and methods associated therewith.

2. Description of Related Art

Laser-based speed measuring devices, which are commonly referred to as "laser guns," are regularly used by law enforcement agencies to monitor vehicle speeds as an aid in enforcing traffic laws.

Laser guns incorporate electronic components whose performance can degrade over time. Since they are not intended to be adjusted by the end user, laser guns require periodic certification to correlate the speed values they display to the actual speed of the object being measured. This becomes especially important when the use of a laser gun by law enforcement agencies results in tangible punishment of offenders of vehicle traffic laws. In many such cases, the accuracy of the laser gun used by the officer is called into question in a court of law.

Since the accuracy of a laser gun may be called into question, accurate records of each certification performed on each laser gun must be maintained over the service life of the laser gun. These records must also be producible quickly upon demand. In some cases it is also mandatory that a third party conduct the actual laser gun certification.

Currently available apparatus and processes used to certify the operation of laser guns suffer from a number of disadvantages including but not limited to:

(a) Certifications can be conducted only by using several discrete pieces of highly specialized and relatively costly electronic test equipment. This equipment is generally suitable for use only in a laboratory environment. The cost of this equipment, plus the skills needed to operate and maintain it, precludes most users of laser guns from having their own certification facilities in-house.

(b) Each individual piece of test equipment used in laser gun certifications is required to be traceable to the National Institute of Standards and Technology (NIST). Taken as a whole, this requirement results in substantial calibration costs for the owner of the test equipment, and periodically requires the entire complement of equipment to be taken out of service for calibration.

(c) Facilities that do have the proper test equipment and personnel are often located some distance from the owners and users of the laser guns. This requires laser guns to be shipped to and from the certification facility. This increases the possibility of the laser guns being damaged or stolen in transit and increases the amount of time the laser guns are out of service, thereby adding additional cost to the process.

(d) Certification records typically are produced through manual data entry or recording techniques, based on sequential manual observations of the test equipment used in the certification process. This process is subject to human error and, because testing always proceeds in a known sequence, provides opportunities for deliberate falsification of data.

(e) Records of certifications may not necessarily be stored in a secure manner, which provides opportunities for falsification of (or other alterations to) the data after a certification had been conducted and validated.

(f) Among the facilities conducting certifications, there is no standard format for certification records and reports, resulting in inconvenience for the users of laser guns and increasing the chance that certification data might be misinterpreted.

(g) Certification requirements vary significantly from user to user (e.g., agency-agency; state-state), and sometimes even within the same law enforcement agency. Because these requirements are inconsistent, there is a very real chance that a particular laser gun, although recently certified, still will not produce accurate results under all conditions in which it might reasonably be used.

The inventor has appreciated the need for apparatus and methods that address and overcome the foregoing disadvantages with current technology and its use.

SUMMARY

Embodiments of the invention are directed to apparatus and methods utilizing such apparatus, for testing and/or certifying the operation of a laser gun.

An exemplary, non-limiting embodiment of the invention is a modularized, plug-and-play-based apparatus used to test and measure the performance of a laser gun. The apparatus includes a main unit with which various modular, plug-and-play test heads can be interfaced to perform the desired testing and certification of a laser gun speed measuring device. More particularly, the apparatus includes a housing comprising a certification unit, which further includes an integrated programmable display that can provide a visual indicia of instructions or data or both to a user; a programmable control circuit including a plurality of functional blocks that provide control instructions for the apparatus, operationally coupled to the programmable display; a plurality of integrated connectors that each provide a plug-and-play-type interface for a respective modular test head; and at least one modular, plug-and-play-type test head including a programmable test control circuit further including a plurality of functional blocks that provide control operations of the test head. The apparatus has at least one of an optical and an electrical interface that enables a respective operational connection with the laser gun and, further wherein the apparatus (excluding the test heads) is self-contained and has size and weight characteristics that enable hand-held transport by the user.

According to various, non-limiting aspects, the at least one modular, plug-and-play-type test head is an optical pulse characterization test head, an optical wavelength measurement test head, a distance measurement test head, an optical power measurement test head, a speed simulation test head, or an internal clock frequency measurement test head.

The various test heads enable measurements of optical pulse characteristics, distance calibration characteristics, optical power characteristics, object speed calibration characteristics, internal clock frequency characteristics, and others. These various characteristics include, but are not limited to, pulse width, pulse frequency, a double-pulse condition, pulse wavelength, short-range distance, long-range distance, optical power, and speed simulation.

Another exemplary, non-limiting embodiment of the invention is an apparatus used to test and measure the performance of a laser gun, similar to the apparatus embodiment described immediately above, except that the separate, modular test heads have been internalized to the main unit; i.e., all circuitry required to enable the test and measurement of parameters required to provide testing and certification of the speed gun in various jurisdictions are contained within a self-contained apparatus of the invention having size and weight characteristics that enable hand-held transport by the user.

Another exemplary, non-limiting embodiment of the invention is directed to a method for making a particular, specified test of a speed gun with the apparatus to determine accuracy of the measurement and, if required, legal certification of the speed gun. In various non-limiting aspects, methods are disclosed for performing 'pulse width,' 'double-pulse,' 'pulse frequency,' 'wavelength,' 'optical power,' 'speed simulation,' internal clock frequency,' sight alignment,' horizontal beam width,' vertical beam width,' and other tests of a laser-gun-type speed measurement apparatus.

These and other embodiments and aspects of the invention are described in detail below with reference to the drawing figures and as defined in the appended claims.

BRIEF DESCRIPTION OF THE DRAWINGS

A complete understanding of the embodiments of the present invention may be obtained by reference to the accompanying drawings, when considered in conjunction with the subsequent detailed description.

DETAILED DESCRIPTION OF EMBODIMENTS OF THE INVENTION

An embodiment of the invention is a modularized test and certification apparatus for a laser-based speed measurement device.

Figure 1:
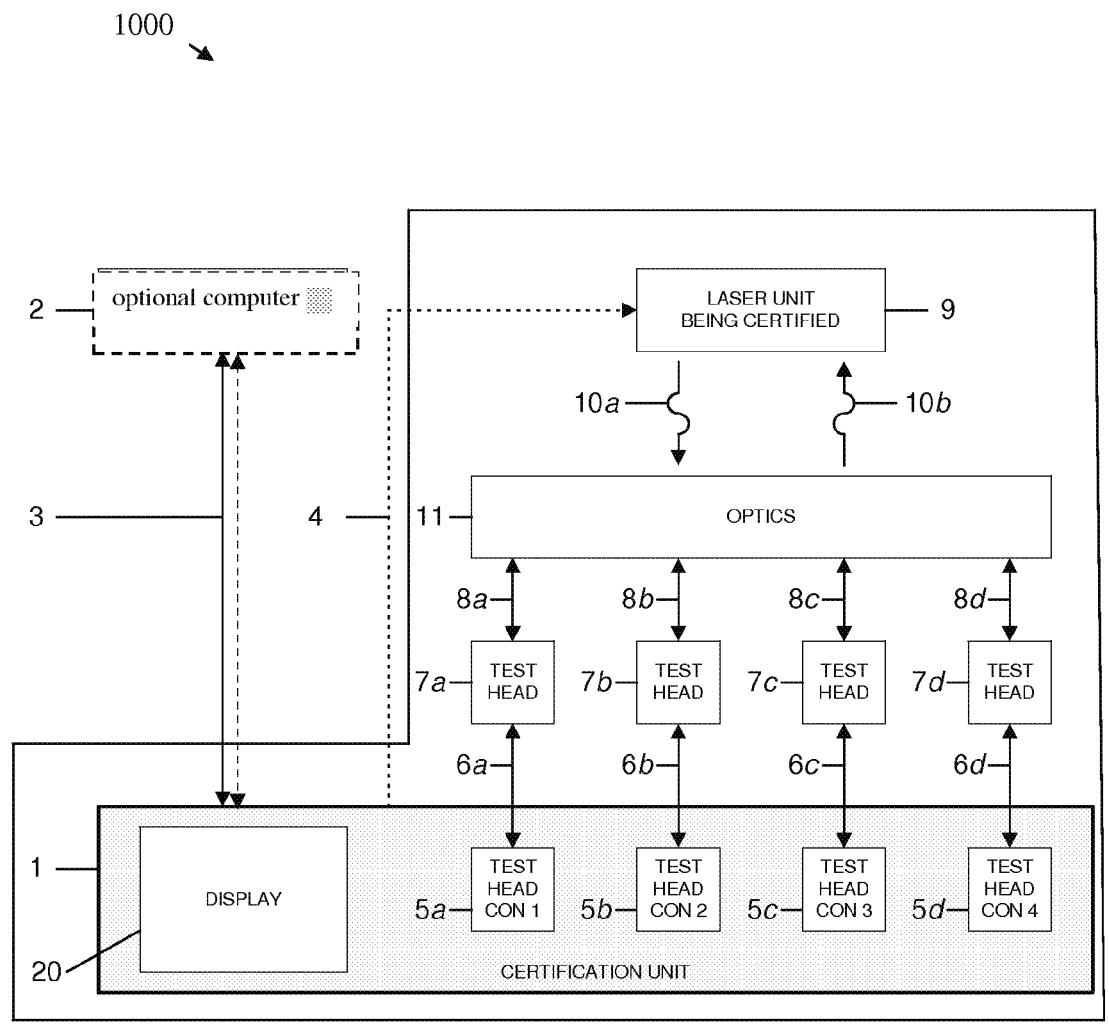
FIG. 1 is a schematic block diagram of a plug-and-play, module-based speed gun test, measurement and certification system according to an embodiment of the invention.

FIG. 1 shows a global block diagram of a test and certification apparatus 1000 according to a non-limiting, illustrative embodiment of the invention. A laser unit under test 9 (not part of the invention per se) generates an optical output 10*a* that is directed to a known, variable combination of optics 11 (optical interface stand), which conditions the optical output (i.e., single output 8*a* and optionally up to three additional outputs 8*b*, 8*c*, 8*d*) in a known manner to allow further processing. The conditioned output(s) 8*a* (through 8*d*) is directed at any given time to only one of several possible modular test heads, 7*a* through 7*d*, which may, as their function requires, also generate an optical signal 10*b* that is returned to the laser unit under test 9. Exemplary test head measurements include 'pulse width,' 'double-pulse detection,' 'pulse frequency,' 'wavelength,' 'optical power,' 'speed simulation,' 'internal clock frequency,' 'sight alignment,' 'horizontal beam width,' 'vertical beam width,' and others. Although in the non-limiting, illustrative embodiment described herein the apparatus 1000 is capable of interfacing to four test heads (7*a*-7*d*) at any given time, any number of test heads may be developed and used. Moreover, the number of interfaces may be expanded to accommodate more than four test heads at the same time.

Upon receiving said conditioned data each test head 7*a* through 7*d* performs internal processing according to its particular purpose and then communicates the results of said processing to the main certification unit 1 via test head connectors 5*a* through 5*d*. The communication 6*a* through 6*d* consists of serial data transferred using an "I Squared C" (I2C) interface. It will be appreciated by those skilled in the art that other types of data transfer mechanisms could also be used. Test heads 7a through 7d also receive operating power and a standard clock signal from test head connectors 5a through 5d.

Upon receiving data from any test head 7a through 7d, certification unit 1 performs further processing of said data in accordance with its current operating mode and shows the results of said processing on display 20, which may be integrated into the certification unit 1. As such, certification unit 1 is capable of independent operation, in which case display 20 functions to present test results and other information to the user, and user select switches 19 (see FIG. 2) function to accept commands from the user. Certification unit 1 may also convey test results to, and accept commands from, a local computer 2 via attachment 3 as shown in FIG. 1 and described in more detail below. (Line 4 is the variable power, e.g. a nominal 12V DC, being supplied to the laser unit under test by the test apparatus).

Figure 2:
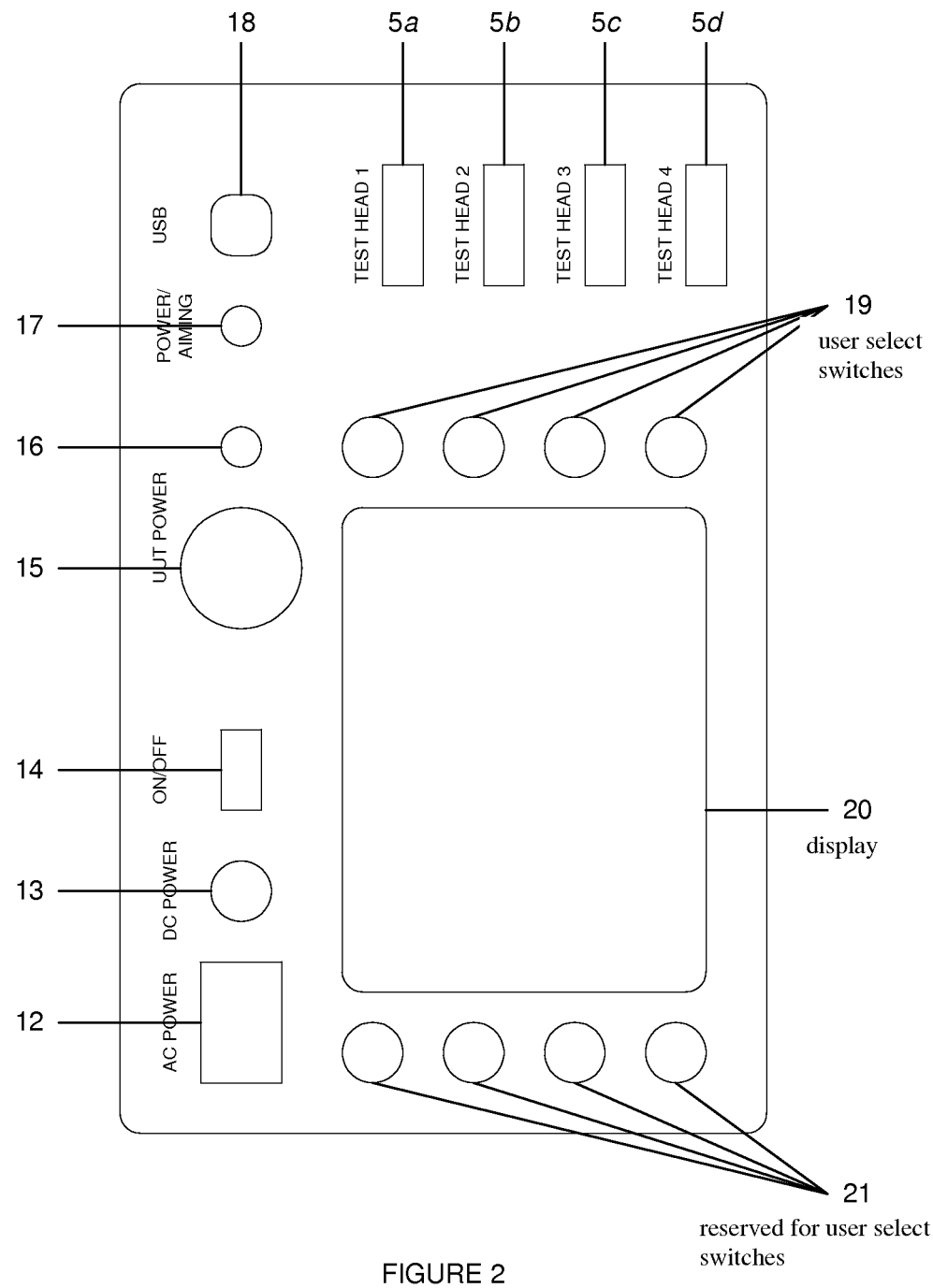
FIG. 2 is a general representation of the control panel of a certification apparatus according to an embodiment of the invention.

FIG. 2 shows the face plate of certification unit 1. AC power receptacle 12 accepts a nominal 120 volts 60 Hz AC. DC power receptacle 13 accepts a nominal 12 volts DC. Switch 14 controls the power on/off function of the certification unit 1.

Receptacle 15 is a cigar plug socket that may be used to supply a variable voltage to a laser unit under test. Indicator 16 is an LED well known to those skilled in the art, which illuminates when power is available at receptacle 15.

Indicator 17 is an LED that illuminates when the certification unit 1 is powered on and operating and also indicates by its color whether or not the output of laser unit under test 9 is being properly directed into the input of the test apparatus.

Connector 18 is a "Universal Serial Bus (USB) Type B". This connector functions to provide communication between the certification unit 1 and an optional local computer 2. Communication methods other than USB as known in the art may be used.

Connectors 5a through 5d provide plug-and-play-type interfaces for one or up to a respective plurality of various modular test heads (designated as 7a through 7d in FIG. 1 and described in more detail below), and may be of a "D-Shell" type known in the art.

Display 20 is a programmable graphic LCD type known in the art. A typical display found suitable for use is the Crystalfontz CFAG320250CX-YYH; other display technologies could be substituted to suit a particular operating environment. Display 20 conveys instructions and/or data to a user (not shown).

Four user select switches 19 provide for setting various operating options described in detail herein below. Each switch is of a pushbutton type. The function of any of the user select switches 19 may vary at any particular time; the operation that will be performed by each switch is indicated by text and/or graphics on display 20 that are positioned adjacent to that particular switch. The four user select switches 21 are reserved for future use and may not be installed in all variations of the embodiment; when installed, they are labeled and operate in the same fashion as the user select switches 19 previously described.

Figure 3A:
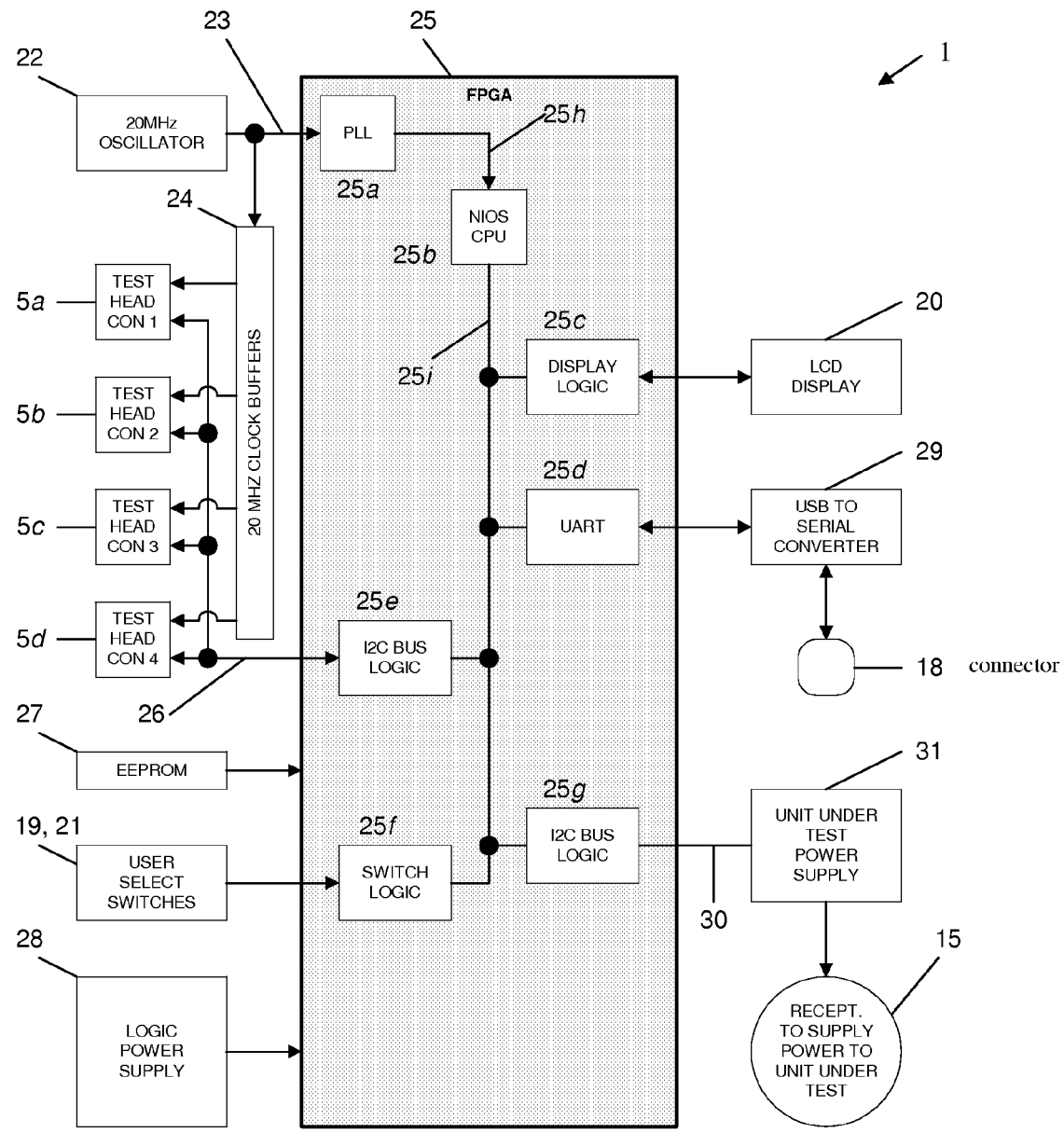
FIG. 3*a* is a schematic block diagram of the certification apparatus shown in FIG. 2.

FIG. 3a shows a detailed block diagram of the certification unit 1. An electronic circuit board contains the items required to perform the signal processing and control functions of certification unit 1. The various voltages required for the operation of this board are provided by logic power supply 28.

A field programmable gate array (FPGA) 25 provides for the majority of the operation of the certification unit 1 via various internal functional blocks that are described below. A device found suitable for use is the Altera EP3C25E144C8NES. The operating configuration for FPGA 25 is stored in an EEPROM 27 and is automatically loaded into the FPGA upon application of power to the system.

A 20 MHz oscillator 22 supplies a master clock 23 for the entire system 1000. Upon being applied to FPGA 25, master clock 23 is stepped up to 80 MHz via Phase Locked Loop (PLL) functional block 25a, whereupon it is used to provide an operating clock 25h for NIOS CPU functional block 25b. 20 MHz master clock 23 is also distributed to test head connectors 5a through 5d by a clock distribution buffer 24; a device found suitable for use is the Cypress CY2304.

The NIOS CPU 25b performs all processing functions of the certification unit 1. Functional block 25c provides display logic to interface CPU 25b to display 20. Functional block 25d provides a UART to interface CPU 25b to USB-to-Serial converter 29, a Silicon Labs CP2102, which in turn supports USB communication via connector 18. Functional block 25f provides de-bouncing logic to interface CPU 25b to User Select Switches 19 (and 21, if used).

Functional block 25e provides a first I2C interface that supports communication 26 with at least one, and up to four, of the modular, external test heads 7a through 7d via test head connectors 5a through 5d. This communication is used to control the test heads and to obtain their result data for further processing. Functional block 25g provides a second I2C interface that supports communication 30 with the Unit-Under-Test Power Supply 31. This communication is used to control the voltage applied to the laser unit under test 9 and also to report the power supply current being drawn by the laser unit under test 9.

Figure 3B:
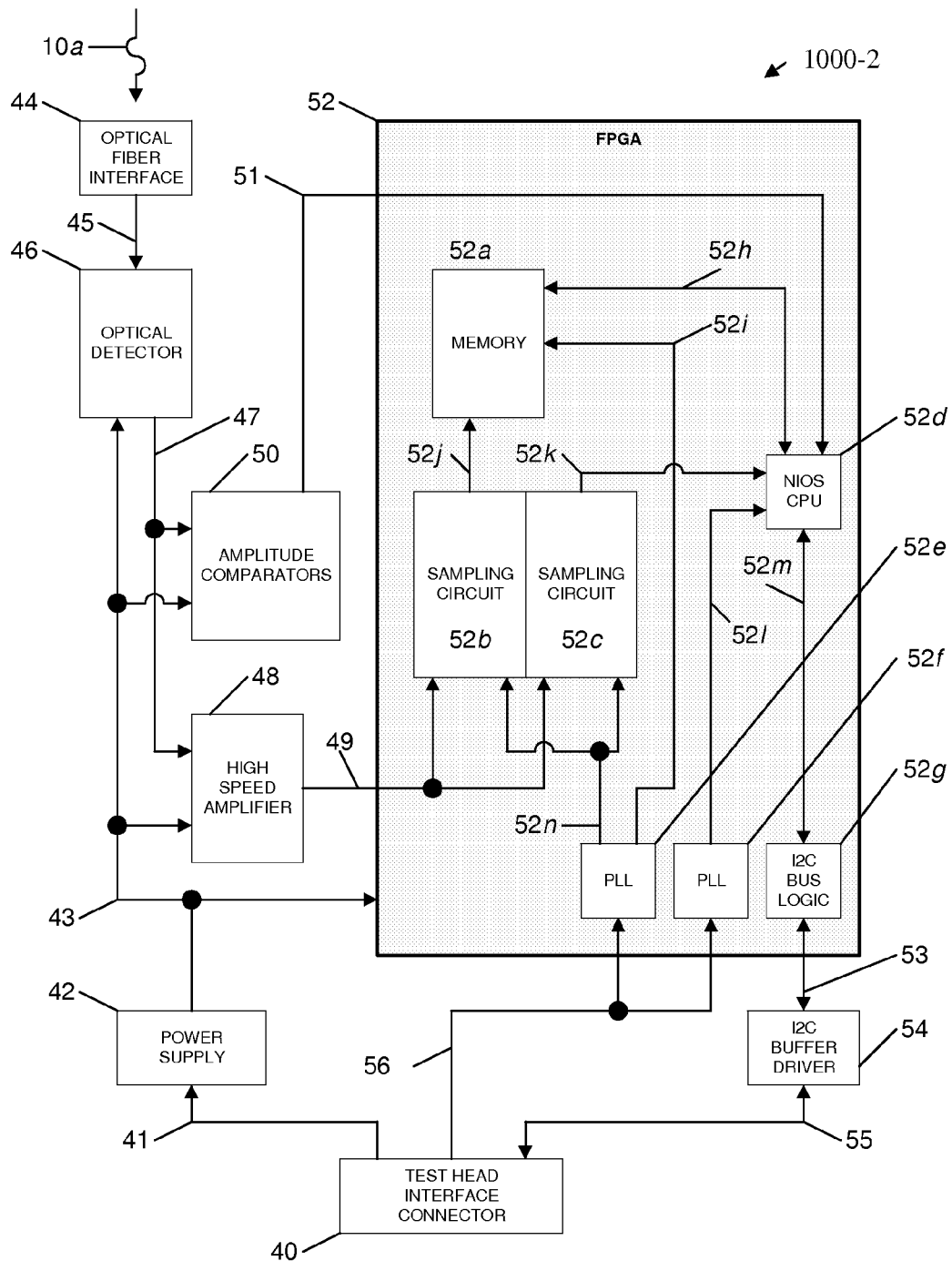
FIG. 3*b* is a schematic block diagram of an optical pulse characterization attachment that interfaces to and operates in conjunction with the certification apparatus shown in FIG. 2.

FIG. 3b shows a detailed block diagram of a modular Optical Pulse Characterization Test Head 1000-2, which interfaces to and operates in conjunction with the certification unit 1. An electronic circuit board contains the items required to perform the signal processing and control functions of the test head.

A field programmable gate array (FPGA) 52 provides for the majority of the operation of the Optical Pulse Characterization Test Head via internal functional blocks described below. A device found suitable for use is the Altera EP3C25F256C7N.

Test head connector 40 provides a nominal 12 volts DC, 41, to power supply circuit 42, which in turn generates and supplies operating voltages 43 to other parts of the test head as required. Test head connector 40 further provides a 20 MHz master clock 56 that is applied to PLL functional block 52f where it is stepped up to 80 MHz to provide an operating clock 52l for NIOS CPU functional block 52d.

Light pulses 10a from the laser unit under test 9 are introduced into the test head via optical fiber interface 44, which comprises a lens system that focuses said light pulses into a fiber optic cable 45, which is in turn connected to optical detector 46. Optical detector 46, a Thor Labs FDS02, converts said light pulses into low-level current pulses 47, which are applied to an amplitude comparator circuit 50 and a high speed amplifier circuit 48. Various optical detectors known in the art could be used to provide this functionality.

Amplitude comparator circuit 50 converts low-level current pulses 47 to a corresponding voltage. This voltage is compared to a reference voltage created by a resistor divider network to determine if it is within a usable range. NIOS CPU 52d reads the result 51 of this comparison and communicates, as described below, an "in range" or "out of range" status to NIOS CPU 28 in the certification unit 1, which illuminates indicator 17 green for an "in range" condition or red for an "out of range" condition.

High speed amplifier circuit 48 converts low-level current pulses 47 to high-level voltage pulses 49 which are at a level that is suitable for use by sampling circuits 52b and 52c and which directly represent the pulse train being emitted by the laser unit under test 9.

Sampling circuit 52b consists of eight parallel sampling paths that operate at phase differences that are successively 45 degrees apart as determined by the inverted and non-inverted states of four separate 400 MHz clocks 52n produced by PLL functional block 52e. Each cycle of eight samples contains a series of "1" or "0" bits that represent whether a pulse from the laser unit under test was present ("1") or not present ("0") at the time that sample was taken. This series of "1" and "0" bits results in an 8-bit block of data 52j which is transferred to memory 52a by clock 52i, which occurs at the end of each $8^{th}$ sample. Said transfers continue until memory 55a has accumulated 512 of said data blocks.

NIOS CPU 52d reads the contents of memory 52a and counts the "1" bits in all 512 data blocks. Based on the known 400 MHz sample rate and the use of 8 phase-shifted sampling paths the NIOS CPU 52d multiplies the count of "1" bits by the sample time to calculate the effective 'pulse width' of the output of the laser unit under test.

NIOS CPU 52d further scans the data in memory 52a for continuity of "1" bits. If one or more "0" bits are found between two "1" bits, the NIOS CPU 52d determines that a "double pulse" event has occurred. After these scans are complete, memory 52a is cleared in preparation for another sampling sequence.

Sampling circuit 52c includes a flip-flop function that toggles from a "0" to a "1" state on every other pulse in the pulse train from the laser unit under test 9, as represented by high-level electrical pulses 49. A counter is provided to accumulate the number of 400 MHz clock pulses that occur when the flip-flop is in the "1" state. When the flip-flop returns to the "0" state the value in the counter is transferred to a latch creating the locked value 52k, and the counter is reset in preparation for the next cycle.

NIOS CPU 52d uses the locked value 52k to determine the pulse period of the output of the laser unit under test by multiplying said latched value by the period of the 400 MHz clock. Upon being queried by NIOS CPU 25b in certification unit 1, NIOS CPU 52d communicates information 52m about the pulse width and pulse period of the output of the laser unit under test 9 as well as whether or not a 'double pulse' event has occurred, to NIOS CPU 25b. Said communication takes place via an I2C pathway consisting of I2C bus logic functional block 52g, I2C low-level data stream 53, I2C buffer-driver 54, and I2C buffered data stream 55. Said information is then used by NIOS CPU 25a in certification unit 1 in determining the outcome of the 'Pulse Width,' 'Pulse Frequency,' or 'Double Pulse' test function that may be active at the particular time.

Figure 3C:
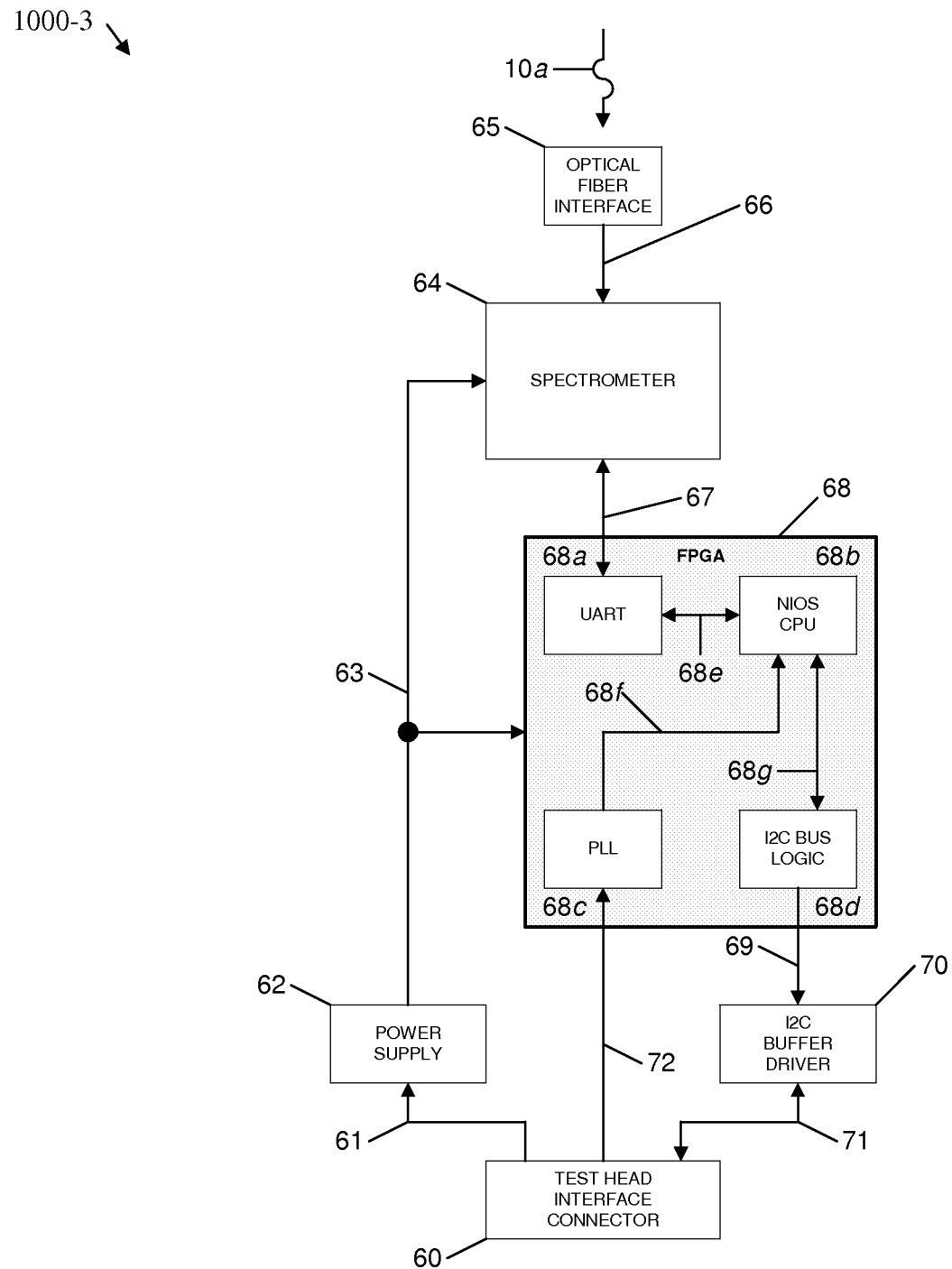
FIG. 3*c* is a schematic block diagram of an optical wavelength measurement attachment that interfaces to and operates in conjunction with the certification apparatus shown in FIG. 2.

FIG. 3c shows a detailed block diagram of an Optical Wavelength Measurement Test Head 1000-3 that interfaces to and operates in conjunction with the certification unit 1. An electronic circuit board contains the items required to perform the signal processing and control functions of the Test Head 1000-3.

A field programmable gate array (FPGA) 68 provides for the majority of the operation of the Optical Wavelength Measurement Test Head 1000-3 via internal functional blocks described below. A device found suitable for use is the Altera EP3C25F256C7N.

Test head connector 60 provides a nominal 12 volts DC, 61, to power supply circuit 62, which in turn generates and supplies operating voltages 63 to other parts of the test head as required. Test head connector 60 further provides a 20 MHz master clock 72 that is applied to PLL functional block 68c where it is stepped up to 80 MHz to provide an operating clock 68f for NIOS CPU functional block 68b.

Light pulses 10a from the laser unit under test 9 are introduced into the test head 1000-3 via optical fiber interface 65, which comprises a lens system that focuses said light pulses into a fiber optic cable 66, which is in turn connected to spectrometer 64. Spectrometer 64 is an Ocean Optics USB4000 type, which uses an optical grating to separate incoming light into individual wavelengths, which are then focused on elements in a linear detector array in a manner such that each array element is capable of measuring the intensity of a specific wavelength of light. Similar devices known in the art could be used to provide the same functionality.

NIOS CPU 68b communicates with spectrometer 64 via UART functional block 68a and serial link 67 to configure spectrometer 64 and to retrieve data from it. The data retrieved is a list of values representing the intensity of the particular wavelength of light that is impacting each linear detector element.

NIOS CPU 68b now searches said list of values to find the highest value in the list. Since the map between the elements of the linear detector and the wavelength applied to each is fixed and well known, the overall wavelength of the laser unit under test 9 is determined to be the same as the wavelength associated with the element position that has the highest value in the list.

Upon being queried by NIOS CPU 25b in certification unit 1, NIOS CPU 68b communicates information 68g about the wavelength of the output of the laser unit under test 9 to NIOS CPU 25b. Said communication takes place via an I2C pathway consisting of I2C bus logic functional block 68d, low-level I2C data stream 69, I2C buffer-driver 70, and I2C buffered data stream 71. Said information is then used by NIOS CPU 25b in certification unit 1 in determining the outcome of the 'Wavelength' test function.

Figure 3D:
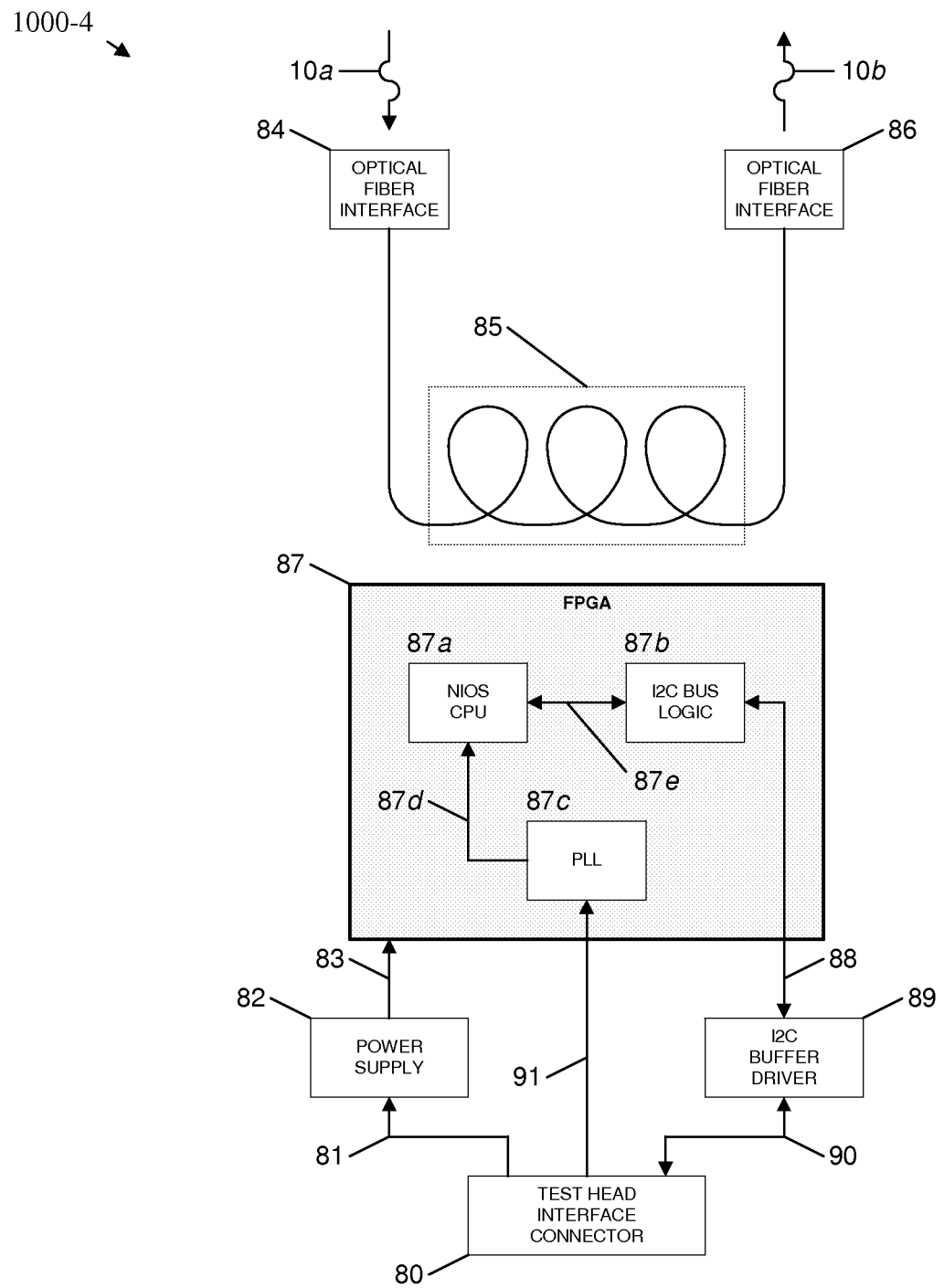
FIG. 3*d* is a schematic block diagram of a distance measurement attachment that interfaces to and operates in conjunction with the certification apparatus shown in FIG. 2.

FIG. 3d shows a detailed block diagram of a Distance Measurement Test Head 1000-4 that interfaces to and operates in conjunction with the certification unit 1. An electronic circuit board contains the items required to perform the signal processing and control functions of the Test Head 1000-4.

FPGA 87 provides for the majority of the operation of the Distance Measurement Test Head 1000-4 via internal functional blocks described below. A device found suitable for use is the Altera EP3C25F256C7N.

Test head connector 80 provides a nominal 12 volts DC, 81, to power supply circuit 82, which in turn generates and supplies operating voltages 83 to other parts of the test head as required. Test head connector 80 further provides a 20 MHz master clock 91 that is applied to PLL functional block 87c where it is stepped up to 80 MHz to provide an operating clock 87d for NIOS CPU functional block 87a.

Light pulses 10a from the laser unit under test 9 are introduced into the test head 1000-4 via optical fiber interface 84, which comprises a lens system that focuses said light pulses into a coil of bare optical fiber 85, the output of which is in turn connected to optical fiber interface 86. Light pulses 10b exiting coil of bare fiber 85 are returned to the laser unit under test 9 after a delay caused by the time it takes for the light to travel said coil of bare fiber 85. This delay corresponds to a known simulated distance and is the basis for the operation of the Distance Measurement Test Head 1000-4. Various shorter and longer fiber coil lengths may be used for short-range and long-range distance calibrations, respectively.

Upon being queried by NIOS CPU 25b in certification unit 1, NIOS CPU 87a communicates the calibrated simulation distance of the coil of bare fiber 85 to NIOS CPU 25b. Said communication takes place via an I2C pathway consisting of I2C bus logic functional block 87b, low-level I2C data stream 88, I2C buffer-driver 89, and I2C buffered data stream 90. Said information is then used by NIOS CPU 25a in certification unit 1 in the operation of the 'Distance Measurement' test function.

Figure 3E:
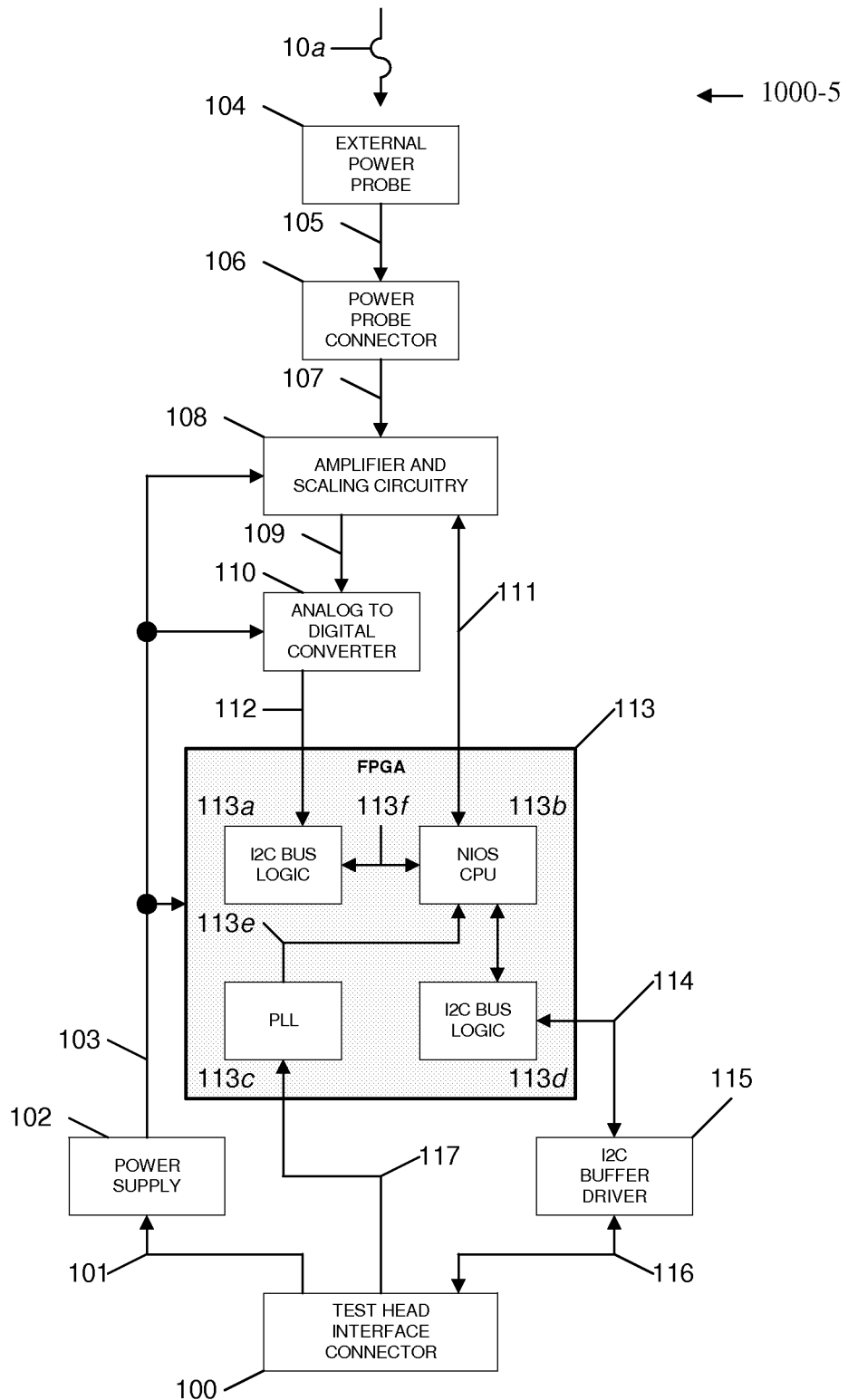
FIG. 3*e* is a schematic block diagram of an optical power measurement attachment that interfaces to and operates in conjunction with the certification apparatus shown in FIG. 2.

FIG. 3e shows a detailed block diagram of an Optical Power Measurement Test Head 1000-5 that interfaces to and operates in conjunction with the certification unit 1. An electronic circuit board contains the items required to perform the signal processing and control functions of the Test Head.

FPGA 113 provides for the majority of the operation of the Optical Power Measurement Test Head 1000-5 via internal functional blocks described below. A device found suitable for use is the Altera EP3C25F256C7N.

Test head connector 100 provides a nominal 12 volts DC, 101, to power supply circuit 102, which in turn generates and supplies operating voltages 103 to other parts of the test head as required. Test head connector 100 further provides a 20 MHz master clock 117 that is applied to PLL functional block 113c where it is stepped up to 80 MHz to provide an operating clock 113e for NIOS CPU functional block 113a.

Light pulses 10a from the laser unit under test 9 are applied to external optical power probe 104, an Ophir PD200-SH-V2, which is individually calibrated for use with a particular instance of test head 1000-5. Optical power probe 104 utilizes a thermopile effect to convert said light pulses into heat, then converts said heat into an electrical current, 105, which is linearly proportional to the optical power of light pulses 10a. Similar devices as known in the art could be used to provide the same functionality.

Electrical current 105 is conveyed via power probe connector 106 and cabling 107 to an amplifier and scaling circuit 108, which converts electrical current 105 to a proportional voltage 109. This conversion is performed using a precision amplifier and collection of four precision resistors with values arranged by factors of 10, which may be switched in and out of the feedback path of the amplifier to change its gain. The switching of the resistors within amplifier and scaling circuit 108 is controlled by NIOS CPU functional block 113b via 4-wire connection 111, each wire being a means by which to select a single one of the four available precision resistors.

Voltage 109 is applied to an analog-to-digital converter circuit 112, which provides 16 bits of resolution; a device found suitable for use is the ADS 1110. NIOS CPU 113a interfaces to and queries analog-to-digital converter circuit 110 via I2C functional block 113a and I2C bus connection 112 and utilizes this interface to retrieve a 16-bit value representing the instantaneous amplitude of voltage 109 at the time of said query.

The aforementioned calibration between power probe 104 and the individual instance of test head 1000-5 consists of two known data points. The first data point represents a power level of 1 microwatt and the second data point represents a power level of 100 milliwatts. These data points are plotted in an X vs. Y fashion such that current is represented on the X axis and power is represented on the Y axis. An imaginary line is then drawn between these two calibrated points. Utilizing the value obtained from analog-to-digital converter circuit 110 and the known value of the precision resistor, which is currently selected for use within amplifier and scaling circuit 108, NIOS CPU 113b calculates a current that is proportional to the optical power of the light pulses from laser unit under test 9. NIOS CPU 113b then applies the well-known formula "Y=MX+B" to the aforementioned imaginary line to convert the calculated current into its corresponding actual optical power value. In this case Y represents power, X represents current, M is the slope of the aforementioned imaginary line and, B is an imaginary point at which the aforementioned imaginary line crosses the Y axis.

Upon being queried by NIOS CPU 25b in certification unit 1, NIOS CPU 113b communicates said calculated optical power to NIOS CPU 25b. Said communication takes place via an I2C pathway consisting of I2C bus logic functional block 113d, low-level I2C data stream 114, I2C buffer-driver 115, and I2C buffered data stream 116. The information is then used by NIOS CPU 25b in certification unit 1 in the operation of the 'Optical Power' test function.

Figure 3F:
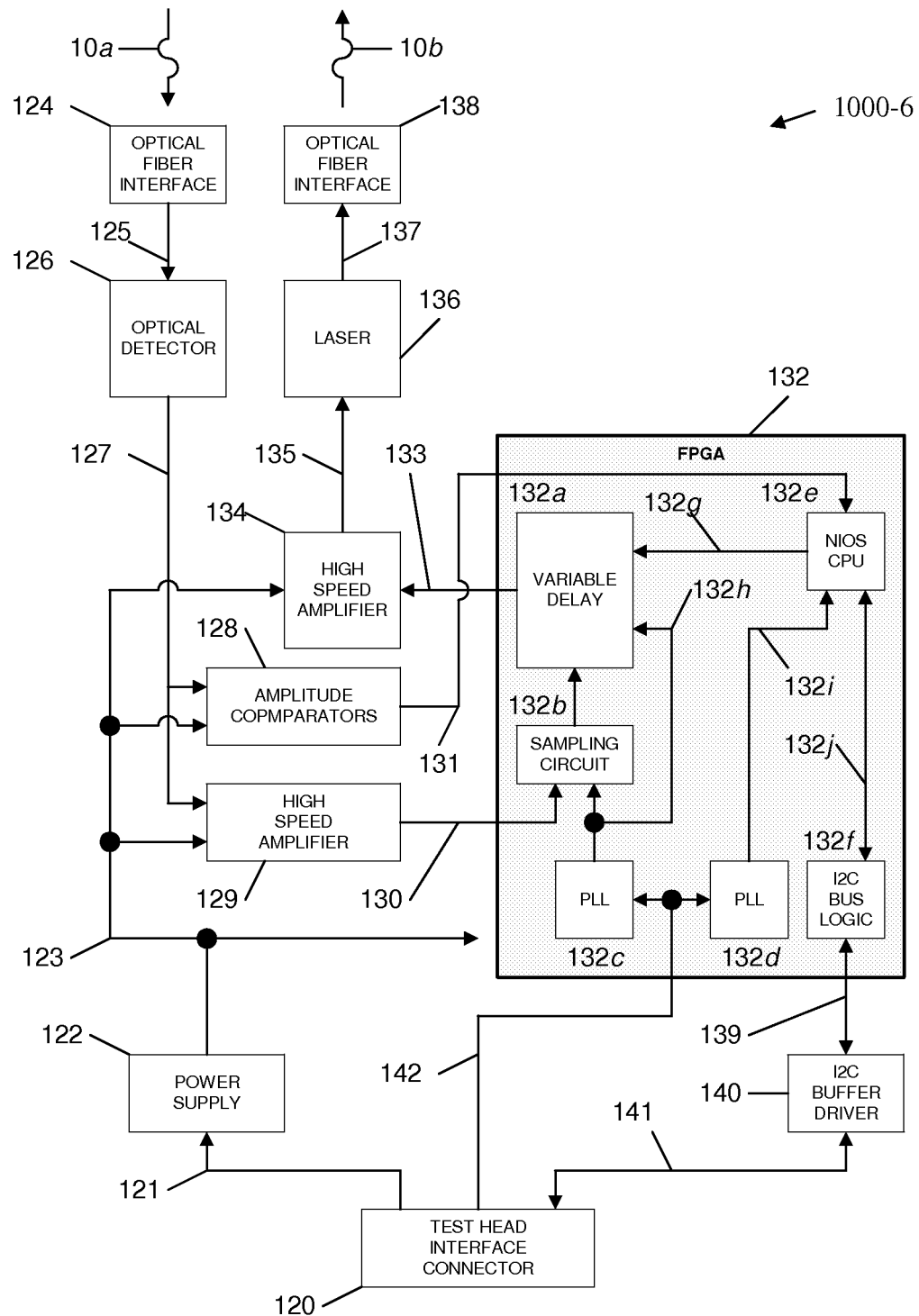
FIG. 3*f* is a schematic block diagram of a speed simulation attachment that interfaces to and operates in conjunction with the certification apparatus shown in FIG. 2.

FIG. 3f shows a detailed block diagram of a Speed Simulation Test Head 1000-6 that interfaces to and operates in conjunction with the certification unit 1. An electronic circuit board contains the items required to perform the signal processing and control functions of the Speed Simulation Test Head.

FPGA 132 provides for the majority of the operation of the Speed Simulation Test Head 1000-6 via internal functional blocks described below. A device found suitable for use is the Altera EP3C25F256C7N.

Test head connector 120 provides a nominal 12 volts DC, 121, to power supply circuit 122, which in turn generates and supplies operating voltages 123 to other parts of the test head as required. Test head connector 120 further provides a 20 MHz master clock 142 that is applied to PLL functional block 132d where it is stepped up to 80 MHz to provide an operating clock 132i for NIOS CPU functional block 132e.

Light pulses 10a from the laser unit under test 9 are introduced into the test head 1000-6 via optical fiber interface 124, which comprises a lens system that focuses the light pulses into a fiber optic cable 125, which is in turn connected to optical detector 126. Optical detector 126 is a Thor Labs FDS02, which converts light into low-level current pulses 127 which are linearly proportional to the optical power of the light pulses. Similar devices as known in the art could be used to provide the same functionality.

Amplitude comparator circuit 128 converts low-level current pulses 127 to a corresponding voltage. This voltage is compared to a reference voltage created by a resistor divider network to determine if it is within a usable range. NIOS CPU 132e reads the result 131 of this comparison and communicates an "in range" or "out of range" status to NIOS CPU 25b in the certification unit 1, which illuminates indicator 17 green for an "in range" condition or red for an "out of range" condition.

High speed amplifier circuit 129 converts low-level current pulses 127 to logic-level voltage pulses 130, which are at a level that is suitable for use by sampling circuit 132b and, which directly represent the pulse train being emitted by the laser unit under test 9.

Sampling circuit 132b consists of eight parallel sampling paths that operate at phase differences that are successively 45 degrees apart as determined by the inverted and non-inverted states of four separate 400 MHz clocks 132h produced by PLL functional block 132c. Logic-level voltage pulses 130 are applied in parallel to all eight sampling paths.

Each of the sampling paths consists of a chain of 16 cascaded 'D' flip-flops that propagate the logic-level pulses 130 at a rate and phase difference determined by the clock associated with that path. When the output of the last flip-flop in the chain goes to a "1" state, this indicates that a pulse from the laser unit under test 9 has been detected. This indication is used to enable variable delay 132a, driven by the clock associated with that path, to begin counting up from a preloaded value, which is obtained from an 11-bit counter that is common to all 8 sampling paths and, which is continuously incremented by a "0" to "1" transition of the logic-level pulses 130. When variable delay 132a reaches its maximum value its output, 133, goes to a logic "1". High speed amplifier 134 increases the amplitude of logic-level signal 133 to produce high-level signal 135, which is sufficient to drive the control pin of laser 136. Laser 136 then emits a pulse that is communicated through optical fiber 137 to optics 138, which in turn produce light pulse 10b that is directed to the input of the laser unit under test 9. Light pulse 10b is interpreted by laser unit under test 9 as if it were a return signal from a target object causing laser unit under test 9 to display a speed reading which corresponds to the described delay.

Sampling circuit 132b includes a flip-flop function that toggles from a "0" to a "1" state on every other pulse in the pulse train from the laser unit under test 9, as represented by high-level electrical pulses 130. A counter is provided to accumulate the number of 400 MHz clock pulses that occur when the flip-flop is in the "1" state. When the flip-flop returns to the "0" state the value in the counter is transferred to a latch creating the locked value 132b and the counter is reset in preparation for the next cycle.

NIOS CPU 132e uses the locked value 132b to determine the pulse period of the output of the laser unit under test 9 by multiplying said latched count by the 2.5 ns period of the 400 MHz clock. By dividing the empirically-derived value of 0.74948 by said pulse period, NIOS CPU 132e calculates the speed that the laser unit under test 9 "should" display. This "expected speed" is typically in the range of 100 miles per hour.

Upon being queried by NIOS CPU 25b in certification unit 1, NIOS CPU 132e communicates the "expected speed" 132j to NIOS CPU 25b. Said communication takes place via an I2C pathway consisting of I2C bus logic functional block 132f, low-level I2C data stream 139, I2C buffer-driver 140, and I2C buffered data stream 141. The information is then used by NIOS CPU 25b in certification unit 1 in the operation of the 'Speed Simulation' test function.

Figure 3G:
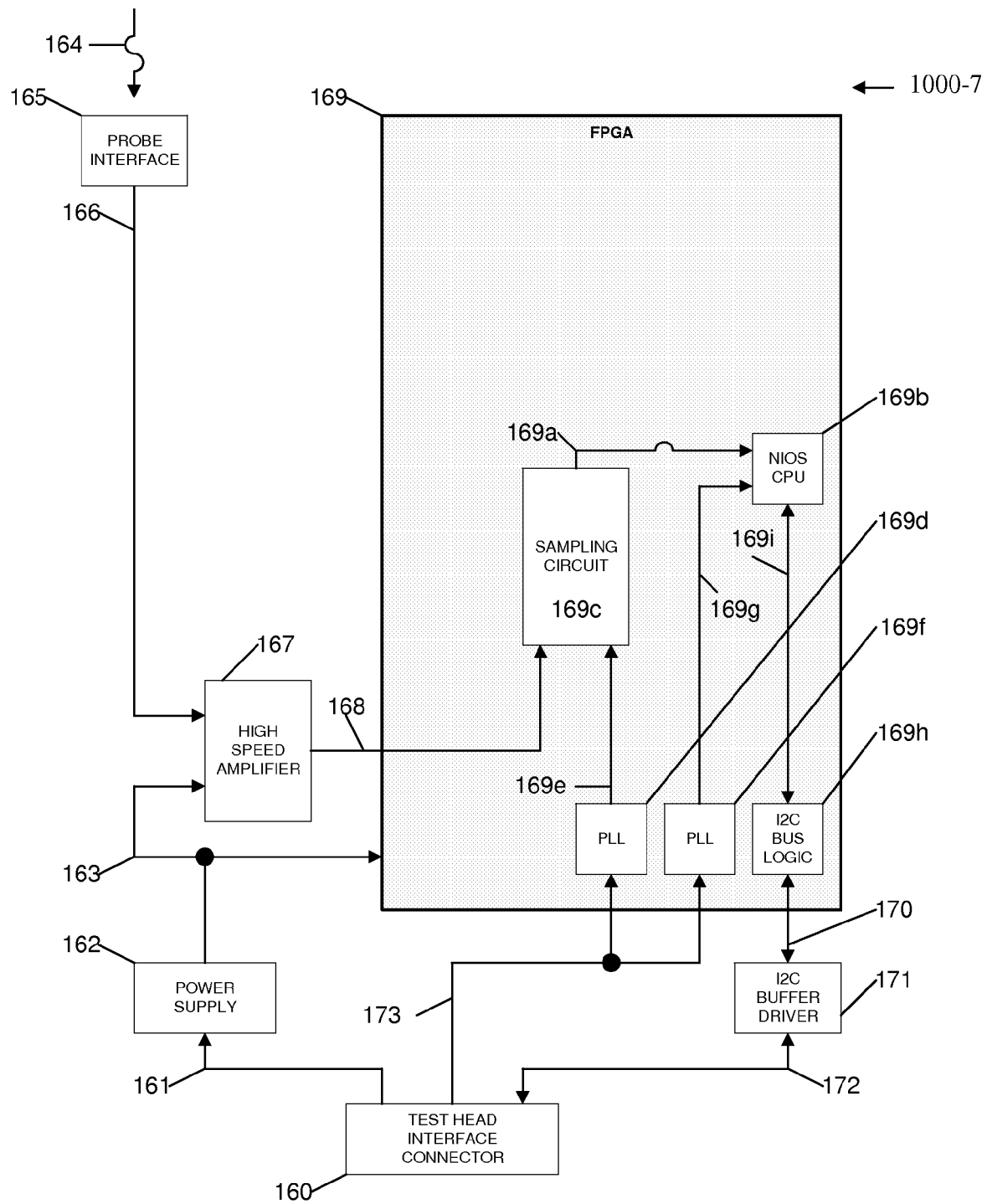
FIG. 3*g* is a schematic block diagram of an internal clock frequency measurement attachment that interfaces to and operates in conjunction with the certification apparatus shown in FIG. 2.

FIG. 3g shows a detailed block diagram of an Internal Clock Frequency Measurement Test Head 1000-7 that interfaces to and operates in conjunction with the certification unit 1. An electronic circuit board contains the items required to perform the signal processing and control functions of the Test Head.

FPGA 169 provides for the majority of the operation of the Internal Clock Frequency Test Head via internal functional blocks described below. A device found suitable for use is the Altera EP3C25F256C7N.

Test head connector 160 provides a nominal 12 volts DC, 161, to power supply circuit 162, which in turn generates and supplies operating voltages 163 to other parts of the test head 1000-7 as required. Test head connector 160 further provides a 20 MHz master clock 173 that is applied to PLL functional block 169f where it is stepped up to 80 MHz to provide an operating clock 169g for NIOS CPU functional block 169b. 20 MHz master clock 173 is also applied to PLL functional block 169d where it is used to provide an operating clock 169e for sampling circuit 169c.

An operating clock signal 164 from the laser unit under test 9 is introduced into the test head 1000-7 via probe interface 165, which comprises an "SMA" style connector that accepts an industry-standard oscilloscope probe. High speed amplifier circuit 167 converts low-level pulses 166 to logic-level voltage pulses 168 that are at a level suitable for use by sampling circuit 132b and, which directly represent the internal operating clock of the laser unit under test 9.

Sampling circuit 169c consists of a counter, which is clocked by pulses 168; and a 1-second timer, which causes the count of pulses to be latched once per second to produce latched value 169a. NIOS CPU 169b interprets the latched value 169a as the actual frequency, in Hz, of the internal clock of the laser unit under test 9.

Upon being queried by NIOS CPU 25b in certification unit 1, NIOS CPU 169b communicates the measured frequency 169i to NIOS CPU 25b. Said communication takes place via an I2C pathway consisting of I2C bus logic functional block 169h, low-level I2C data stream 170, I2C buffer-driver 171, and I2C buffered data stream 172. The information is then used by NIOS CPU 25b in certification unit 1 in the operation of the 'Internal Clock Frequency' test function.

Figure 4:
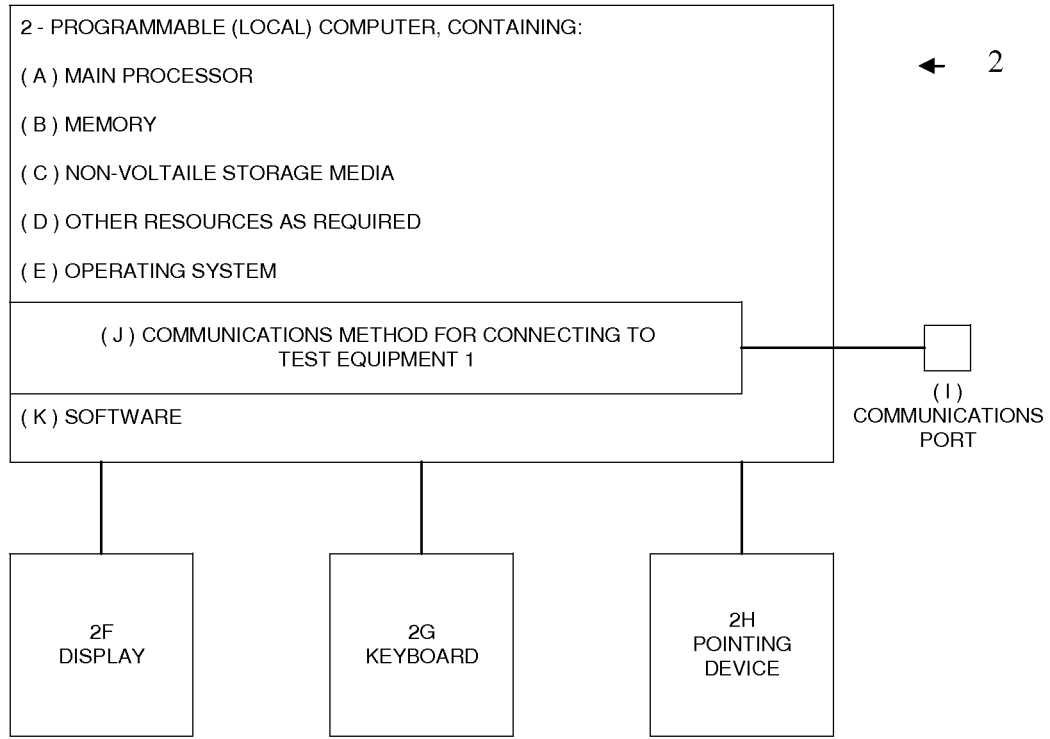
FIG. 4 is a block diagram of a computer system for use with the apparatus according to an aspect of the invention.

FIG. 4 shows a block diagram of an optional computer system 2 that may function to collect and process test result data generated by the embodied apparatus 1000.

Programmable computer 2 comprises a main processor 2a, memory 2b, non-volatile storage media 2c, and other I/O resources 2d as required to allow computer system 2 to run a commercial operating system software suited to the requirements of the invention. A large variety of computer hardware exists that can be combined in a variety of suitable fashions to meet the operating requirements of the invention. The operating system 2e is typically Windows XP®, Windows Vista®, or Windows 7®, produced by Microsoft Corporation. Subsequent iterations of these systems as well as other operating systems known in the art offering comparable capabilities could also be used.

A display 2f, commonly a video screen, and user input means, commonly a combination of a keyboard 2g and pointing device 2h, allow a user to interact with computer system 2. Other means of user input (touch screen, voice recognition, pen-based, etc.) may also be used in addition to, or in place of, a keyboard and pointing device.

Also included in computer system 2 is a communication means 2j, in this case a device driver that emulates a serial port and, a communications port 2i, in this case a USB port, both used in combination to communicate with certification unit 1. Other known means of communication may be used in place of the combination of a serial port emulation device driver and USB connection if conditions require.

Programmable computer 2 along with operating system software 2e allows running application software 2k to perform the functions of a client in a data storage and retrieval network and to interact directly with the certification unit 1 as described in more detail below.

Operation of the Invention

The following paragraphs describe further details of various exemplary test functions within the certification unit 1 and the plurality of modular test heads that may be used in conjunction with the certification unit 1.

Figure 5:
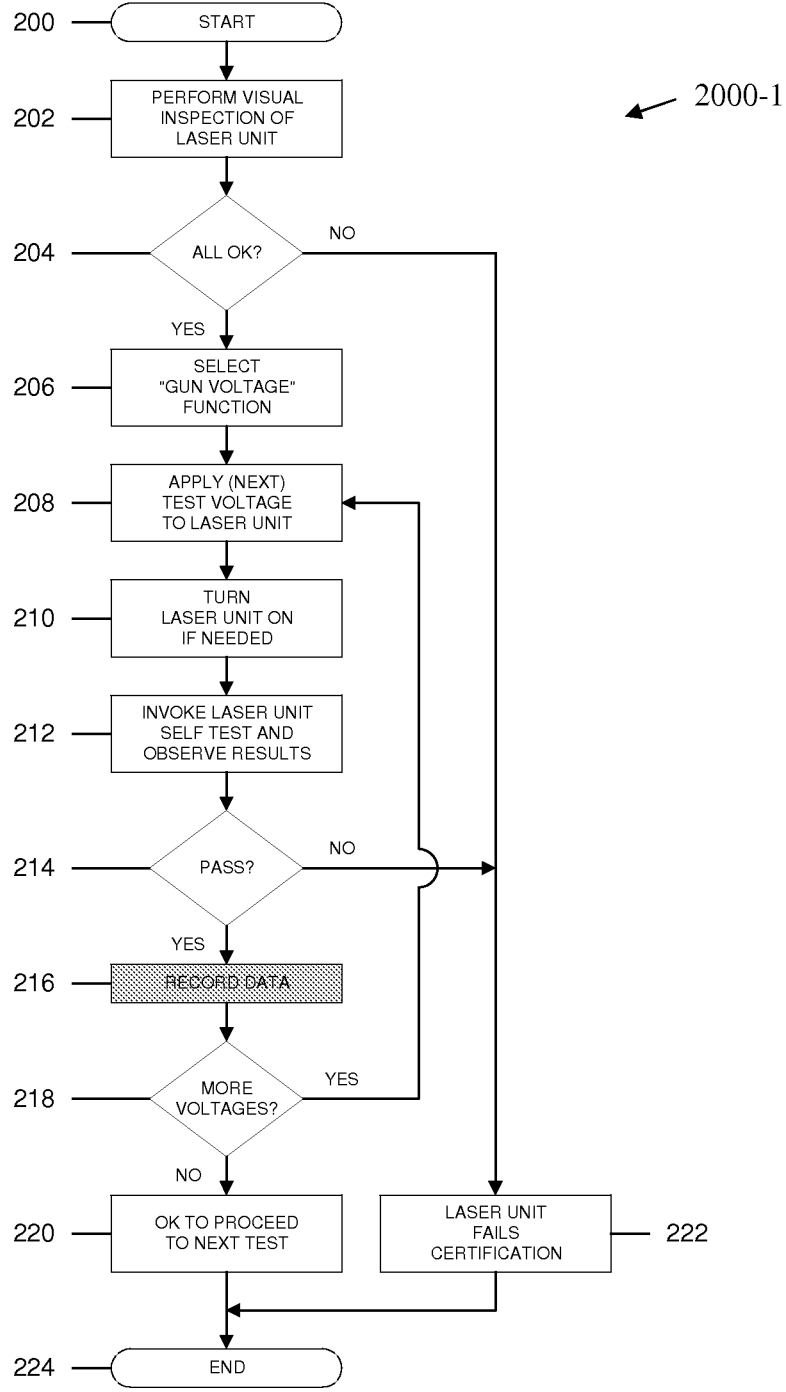
FIG. 5 is a flow chart of a "controls operational" verification test according to an aspect of the invention.

FIG. 5 shows a flow chart 2000-1 of a "Controls Operational" test that may be applied to the laser unit under test 9 and, which may comprise some or all of the following general sequence of actions according to a non-limiting, exemplary aspect of the invention.

(a) The user is instructed at step 202 to conduct a visual inspection of the laser unit under test 9 to ensure there are no obvious physical defects that would prevent the laser unit under test 9 from being used in normal service. Said instruction may be from prior training of the user, may be displayed on the screen of local computer 2 if connected, or displayed on display 20.

(b) If the visual inspection shows any defects (step 204) the laser unit under test 9 fails certification (step 224). The "Controls Operational" test is then concluded at step 224 and no further testing takes place; otherwise, (c) Next, certification unit 1 is placed in an operating mode whose primary purpose is only to vary the power supply voltage to the laser unit under test 9 (step 206). Said mode selection may be accomplished via user select switches 19 of the certification unit 1 or via commands from local computer 2 if connected.

(d) Next, certification unit 1 may apply (as necessary, which may not be the case for laser units that are hard-wired into a vehicle) a specified voltage to receptacle 15 for use by the laser unit under test 9 (step 208). Said voltage may be specified via user select switches 19 of the certification unit 1 or via commands from local computer 2 if connected.

(e) Next, the user is instructed to turn the laser unit under test 9 on if required (step 210) and is then instructed in the same fashion to invoke a typical self test feature of laser unit under test 9 and observe the results in conjunction with the description of said self test as may be contained in the operating manual for the laser unit under test 9 (step 212). Said instruction may be from prior training of the user or may be displayed on the screen of local computer 2 if connected. The certification unit 1 may retrieve the serial number and calibration information of the test head and retain it locally for later use or may transmit the information to local computer 2 if connected.

(f) If the self test of the laser unit under test 9 fails (step 214), the laser unit under test 9 fails certification at step 224. The "Controls Operational" test is then concluded (step 224) and no further testing takes place; otherwise, (g) If the self test of the laser unit under test 9 passes (step 214), the user records this result (step 216). Said recording may be made manually by the user or automatically by the local computer 2 if connected.

(h) It is next determined if the "Controls Operational" test is to be repeated at another, different power supply voltage (step 218). Said determination may be made manually by the user or automatically by local computer 2 if connected. If the determination is to repeat the test at another, different power supply voltage, execution of the test returns to step 208.

(i) When the "Controls Operational" test has been successfully concluded at all desired power supply voltages the laser unit under test 9 is considered to have passed the "Controls Operational" test and is eligible to continue the test process (step 220). The "Controls Operational" test is then concluded at step 224.

Figure 6:
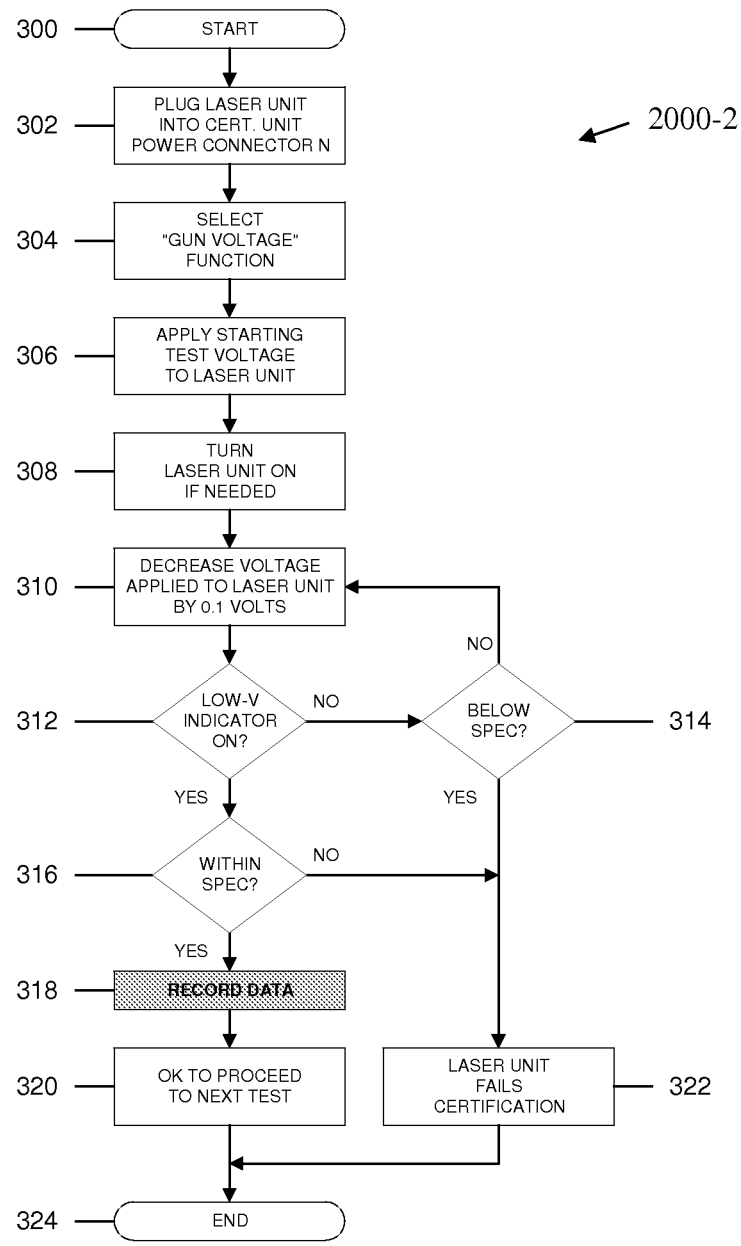
FIG. 6 is a flow chart of a "low voltage indicator" verification test according to an aspect of the invention.

FIG. 6 shows a flow chart 2000-2 of a "Low Voltage Indicator" test that may be applied to laser unit under test 9 and, which may comprise some or all of the following general sequence of actions according to a non-limiting, exemplary aspect of the invention.

(a) The user is instructed to plug the laser unit under test 9 into receptacle 15 of the certification unit 1 (step 302). Said instruction may be from prior training, may be displayed on the screen of local computer 2 if connected or on display 20.

(b) Next, certification unit 1 is placed in an operating mode whose primary purpose is only to vary the power supply voltage to the laser unit under test 9 (step 304). Said mode selection may be accomplished via user select switches 19 of the certification unit 1 or via commands from local computer 2 if connected.

(c) Next, certification unit 1 may, as necessary, apply a specified starting voltage to receptacle 15 for use by the laser unit under test 9 (step 306). Said starting voltage may be specified via user select switches 19 of the certification unit 1 or via commands from local computer 2 if connected.

(d) Next, the user is instructed to turn the laser unit under test 9 on if required (step 308). Said instruction may be from prior training of the user, may be displayed on the screen of local computer 2 if connected or on display 20. The certification unit 1 may retrieve the serial number and calibration information of the test head and retain it locally for later use or may transmit the information to local computer 2 if connected.

(e) Next, the supply voltage being applied to laser unit under test 9 is decreased by 0.1 volts (step 310). Said decrease may be accomplished via user select switches 19 of the certification unit 1 or via commands from local computer 2 if connected.

(f) If the "Low Voltage" indicator on the laser unit under test 9 is not illuminated (step 312) and the voltage currently being applied to the laser unit under test 9 is greater than the point at which the "Low Voltage" indicator of the laser unit under test 9 is specified to illuminate (step 314), the process continues at step 310 as previously described in paragraph (e).

(g) If the "Low Voltage" indicator on the laser unit under test 9 is not illuminated (step 312) and the voltage currently being applied to the laser unit under test 9 is less than the point at which the "Low Voltage" indicator of the laser unit under test 9 is specified to illuminate (step 314), the laser unit under test 9 fails certification (step 322). The "Low Voltage" test is then concluded at step 324 and no further testing takes place; otherwise, (h) If the "Low Voltage" indicator on the laser unit under test 9 is illuminated (step 312) a comparison is made between the supply voltage being applied to laser unit under test 9 and the point at which the "Low Voltage" indicator of the laser unit under test 9 is specified to illuminate (step 316). If said supply voltage is within a specified range of said specified illumination point, the user records this result (step 318). Said recording may be made manually by the user or automatically by the local computer 2 if connected.

(i) The laser unit under test 9 is now considered to have passed the "Low Voltage Indicator" test and is eligible to continue the test process (step 320). The "Low Voltage Indicator" test is then concluded at step 324.

Figure 7:
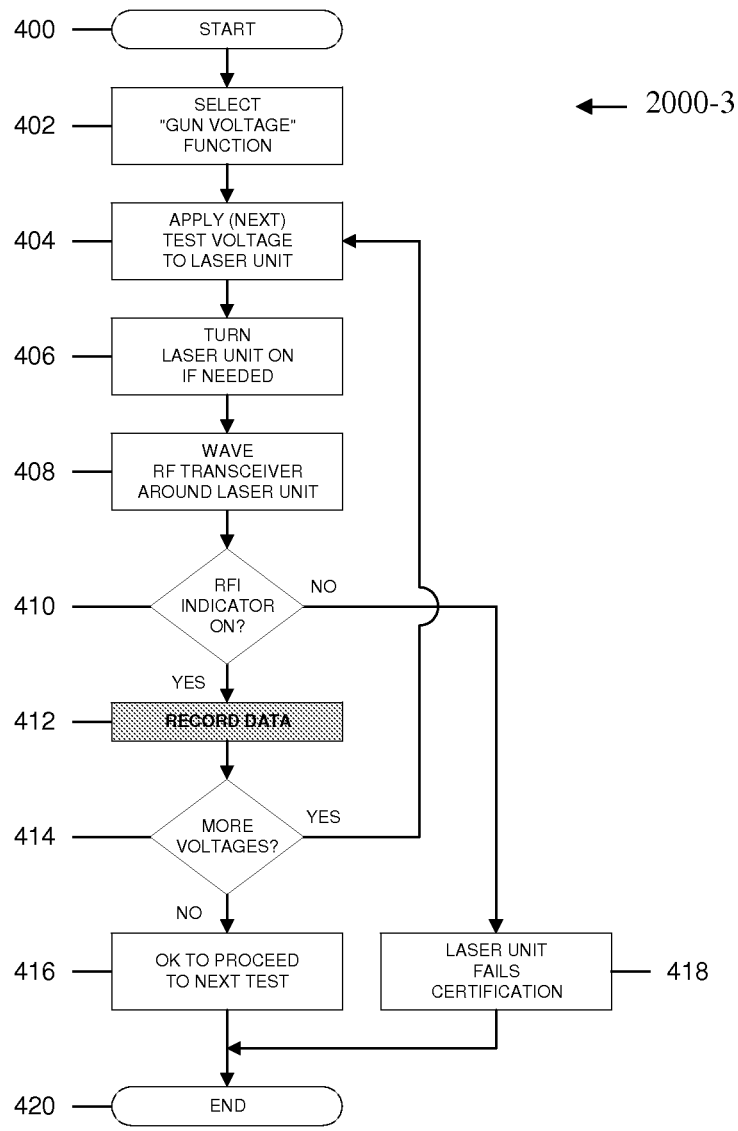
FIG. 7 is a flow chart of a "radio frequency interference indicator" verification test according to an aspect of the invention.

FIG. 7 shows a flow chart 2000-3 of a "Radio Frequency Interference" test that may be applied to laser unit under test 9 and, which may comprise some or all of the following general sequence of actions according to a non-limiting, exemplary aspect of the invention.

(a) First, certification unit 1 is placed in an operating mode whose primary purpose is only to vary the power supply voltage to the laser unit under test 9 (step 402). Said mode selection may be accomplished via user select switches 19 of the certification unit 1 or via commands from local computer 2 if connected.

(b) Next, certification unit 1 may, as necessary, apply a specified voltage to receptacle 15 for use by the laser unit under test 9 (step 404). Said voltage may be specified via user select switches 19 of the certification unit 1 or via commands from local computer 2 if connected. The certification unit 1 may retrieve the serial number and calibration information of the test head and retain it locally for later use or may transmit the information to local computer 2 if connected.

(c) Next, the user is instructed to turn the laser unit under test 9 on if required (step 406). Said instruction may be from prior training of the user, may be displayed on the screen of local computer 2 if connected or on display 20.

(d) Next, the user is instructed to place an RF transceiver (not shown) in close proximity to the laser unit under test 9 and then to observe an "RFI" indicator on the laser unit under test 9 (step 408). Said instruction may be from prior training of the user or may be displayed on the screen of local computer 2 if connected.

(e) If the "RFI" indicator of the laser unit under test 9 fails to illuminate (step 410), the laser unit under test 9 fails certification (step 418). The "Radio Frequency Interference" test is then concluded at step 420 and no further testing takes place; otherwise, (f) If the "RFI" indicator of the laser unit under test 9 illuminates (step 410), the user records this result (step 412). Said recording may be made manually by the user or automatically by the local computer 2 if connected.

(g) It is next determined if the "Radio Frequency Interference" test is to be repeated at another, different power supply voltage (step 414). Said determination may be made manually by the user or automatically by local computer 2 if connected. If the determination is to repeat the test at another, different power supply voltage, execution of the test returns to step 404.

(h) When the "Radio Frequency Interference" test has been successfully concluded at all desired power supply voltages the laser unit under test 9 is considered to have passed the "Radio Frequency Interference" test and is eligible to continue the test process (step 416). The "Radio Frequency Interference" test is then concluded at step 420.

Figure 8:
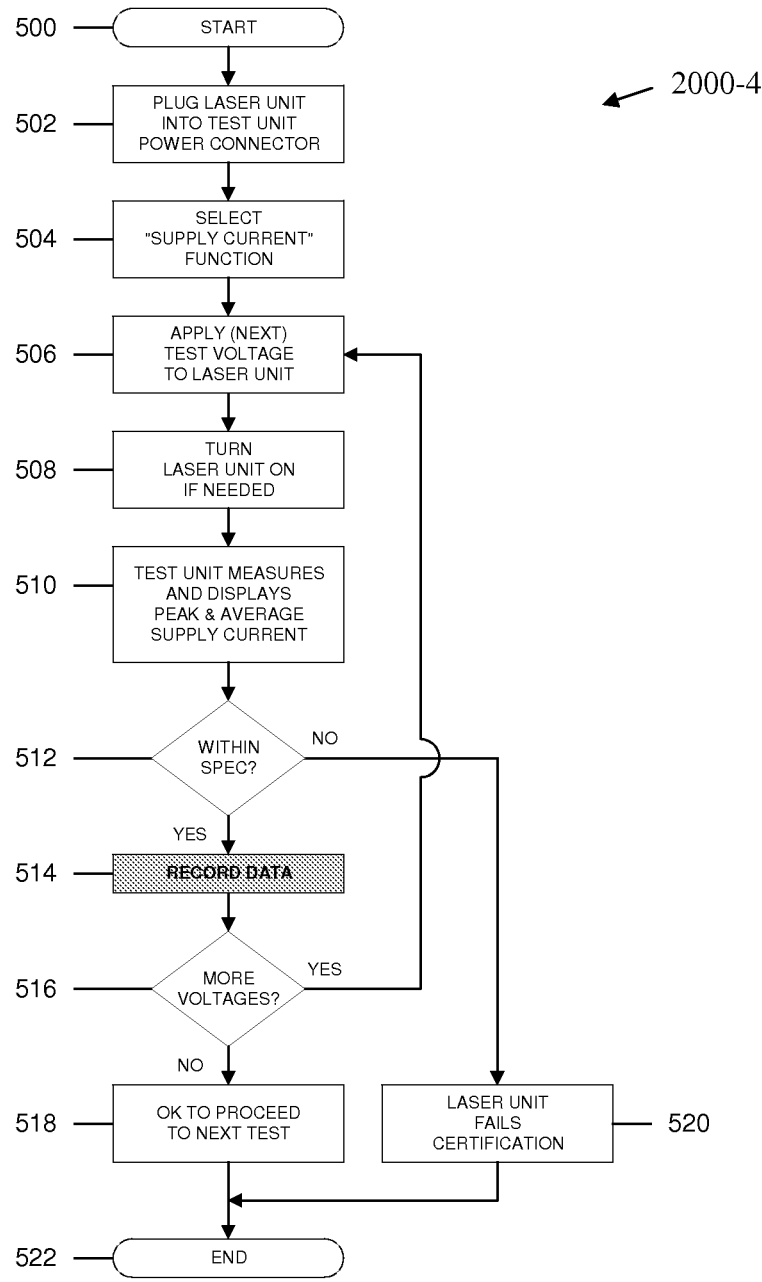
FIG. 8 is a flow chart of a "power supply current" verification test according to an aspect of the invention.

FIG. 8 shows a flow chart 2000-4 of a "Power Supply Current" test that may be applied to laser unit under test 9 and, which may comprise some or all of the following general sequence of actions according to a non-limiting, exemplary aspect of the invention.

(a) The user is instructed to plug the laser unit under test 9 into receptacle 15 of the certification unit 1 (step 502). Said instruction may be from prior training of the user or may be displayed on the screen of local computer 2 if connected.

(b) Next, certification unit 1 is placed in an operating mode whose primary purpose is to measure the amount of power supply current being drawn by the laser unit under test 9 (step 504). Said mode selection may be accomplished via user select switches 19 of the certification unit 1 or via commands from local computer 2 if connected. The certification unit 1 may retrieve the serial number and calibration information of the test head and retain it locally for later use or may transmit the information to local computer 2 if connected.

(c) Next, certification unit 1 may, as necessary, apply a specified voltage to receptacle 15 for use by the laser unit under test 9 (step 506). Said voltage may be specified via user select switches 19 of the certification unit 1 or via commands from local computer 2 if connected.

(d) Next, the user is instructed to turn the laser unit under test 9 on if required (step 508). Said instruction may be from prior training of the user or may be displayed on the screen of local computer 2 if connected.

(e) Next, the certification unit 1 measures the amount of power supply current being drawn by the laser unit under test 9 and displays this measurement to the user as a peak value and as an instantaneous value (step 510). Said measurements may be shown on the display 20 of the certification unit 1 or on the screen of local computer 2 if connected.

(f) Next, a comparison is made between the measured peak power supply current drawn by laser unit under test 9 and the range of power supply current that the laser unit under test 9 is specified to consume (step 512). If said peak current is not within said specified range the laser unit under test 9 fails certification (step 520). The "Power Supply Current" test is then concluded at step 224 and no further testing takes place; otherwise, (g) If said peak current is within said specified range the user records this result along with the peak current measurement (step 514). Said recording may be made manually by the user or automatically by the local computer 2 if connected.

(h) It is next determined if the "Power Supply Current" test is to be repeated at another, different power supply voltage (step 516). Said determination may be made manually by the user or automatically by local computer 2 if connected. If the determination is to repeat the test at another, different power supply voltage, execution of the test returns to step 506.

(i) When the "Power Supply Current" test has been successfully concluded at all desired power supply voltages the laser unit under test 9 is considered to have passed the "Power Supply Current" test and is eligible to continue the test process (step 518). The "Power Supply Current" test is then concluded at step 522.

Figure 9:
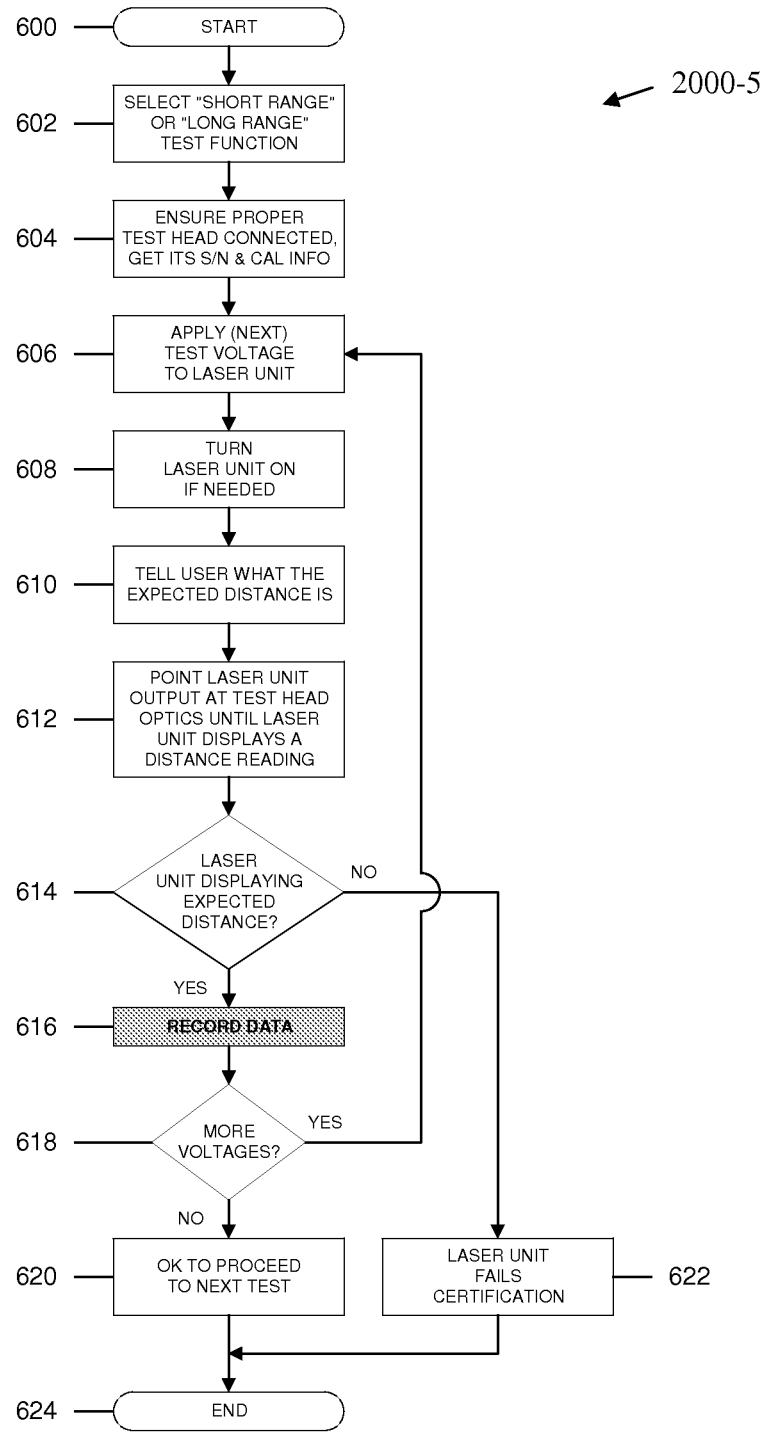
FIG. 9 is a flow chart of a "distance" verification test according to an aspect of the invention.

FIG. 9 shows a flow chart 2000-5 of a "Distance Measurement" test that may be applied to laser unit under test 9 and, which may comprise some or all of the following general sequence of actions according to a non-limiting, exemplary aspect of the invention.

(a) First, certification unit 1 is placed in an operating mode whose primary purpose is to conduct either a Short Range Distance Test or a Long Range Distance Test (step 602). Said mode selection may be accomplished via user select switches 19 of the certification unit 1 or via commands from local computer 2 if connected.

(b) Next, the user is instructed to connect either the "Short Range Distance Test Head" or the "Long Range Distance Test Head" (not shown) to the certification unit 1 and the test does not proceed until connection of the proper test head is detected (step 604). Said instruction may be from prior training of the user or may be displayed on the screen of local computer 2 if connected. Also as part of step 604, certification unit 1 may retrieve the serial number and calibration information of the test head and retain it locally for later use or may transmit the information to local computer 2 if connected.

(c) Next, certification unit 1 may, as necessary, apply a specified voltage to receptacle 15 for use by the laser unit under test 9 (step 606). Said voltage may be specified via user select switches 19 of the certification unit 1 or via commands from local computer 2 if connected.

(d) Next, the user is instructed to turn the laser unit under test 9 on if required (step 608). Said instruction may be from prior training of the user or may be displayed on the screen of local computer 2 if connected.

(e) Next, the "expected distance" for the current test is presented to the user (step 610). Said presentation may be via display 20 of the certification unit 1 or via the screen of local computer 2 if connected.

(f) Next, the user is instructed to point the output of the laser unit under test 9 at the optical interface stand 11 (see FIG. 1) interfaced to the test head(s) and to re-orient the laser unit under test 9 in relation to said optics 11 until the laser unit under test 9 displays a valid distance reading (step 612). Said instruction may be from prior training of the user or may be displayed on the screen of local computer 2 if connected.

(g) Next, the user is instructed to compare the distance displayed by the laser unit under test 9 to the "expected distance" that was presented to the user in step 610. Said instruction may be from prior training of the user or may be displayed on the screen of local computer 2 if connected. If the result of said comparison is that the distance displayed by the laser unit under test 9 is not within a specified range of the aforementioned "expected distance" the laser unit under test 9 fails certification (step 622). The "Distance Measurement" test is then concluded at step 624 and no further testing takes place; otherwise, (h) If said comparison indicates that the distance displayed by the laser unit under test 9 is within a specified range of the aforementioned "expected distance" the user records this result along with the actual distance displayed by the laser unit under test 9 (step 616). Said recording may be made manually by the user or automatically by the local computer 2 if connected.

(i) It is next determined if the "Distance Measurement" test is to be repeated at another, different power supply voltage (step 618). Said determination may be made manually by the user or automatically by local computer 2 if connected. If the determination is to repeat the test at another, different power supply voltage, execution of the test returns to step 606.

(j) When the "Distance Measurement" test has been successfully concluded at all desired power supply voltages the laser unit under test 9 is considered to have passed the "Distance Measurement" test and is eligible to continue the test process (step 620). The "Distance Measurement" test is then concluded at step 522.

Figure 10:
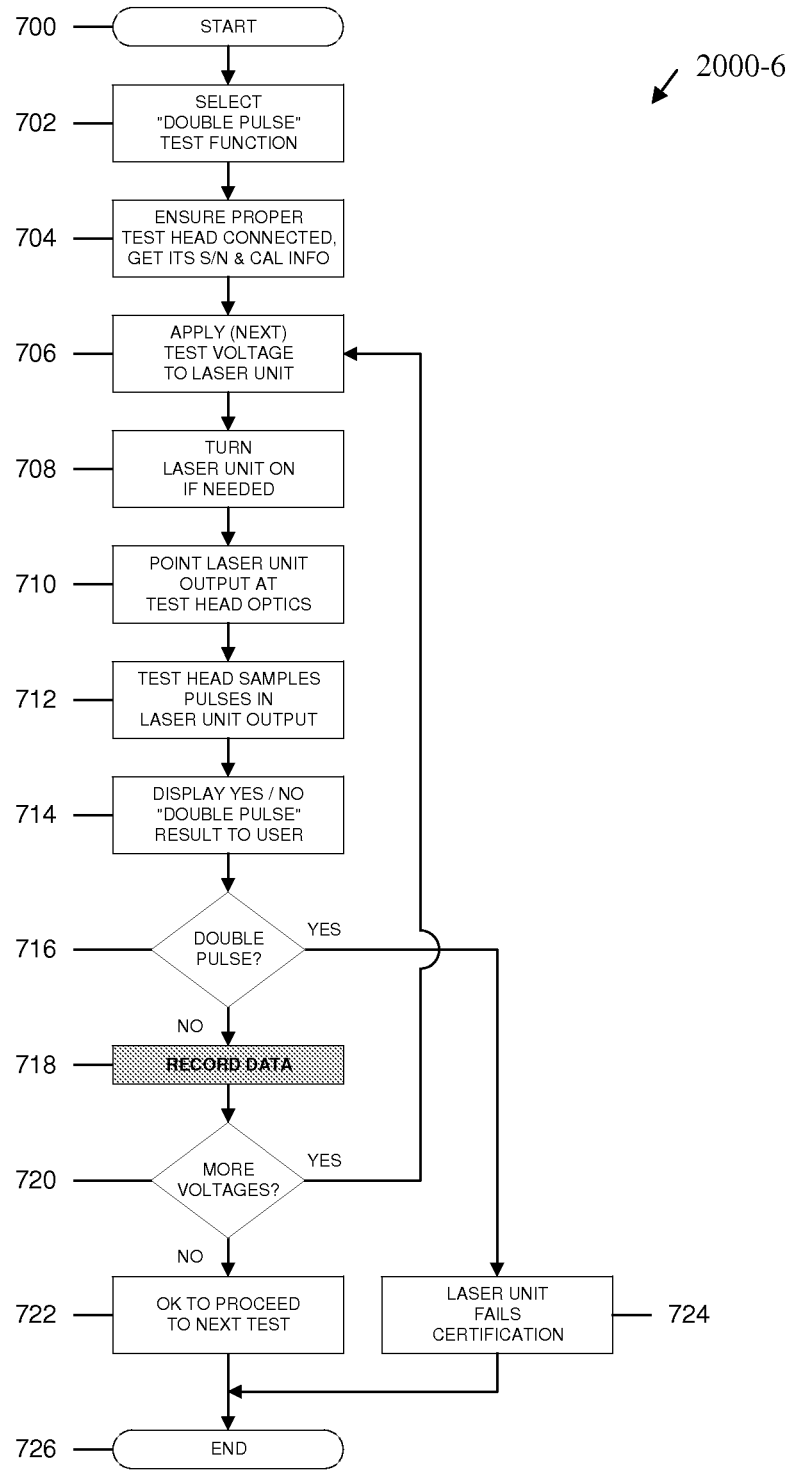
FIG. 10 is a flow chart of a "double pulse" verification test according to an aspect of the invention.

FIG. 10 shows a flow chart 2000-6 of a "Double Pulse" test that may be applied to laser unit under test 9 and, which may comprise some or all of the following general sequence of actions according to a non-limiting, exemplary aspect of the invention.

(a) First, certification unit 1 is placed in an operating mode whose primary purpose is to conduct a Double Pulse Test (step 702). Said mode selection may be accomplished via user select switches 19 of the certification unit 1 or via commands from local computer 2 if connected.

(b) Next, the user is instructed to connect the "Pulse Characterization Test Head" (not shown) to the certification unit 1 and the test does not proceed until connection of the proper test head is detected (step 704). Said instruction may be from prior training of the user or may be displayed on the screen of local computer 2 if connected. Also as part of step 704, the certification unit 1 may retrieve the serial number and calibration information of the test head and retain it locally for later use or may transmit the information to local computer 2 if connected.

(c) Next, certification unit 1 may, as necessary, apply a specified voltage to receptacle 15 for use by the laser unit under test 9 (step 706). Said voltage may be specified via user select switches 19 of the certification unit 1 or via commands from local computer 2 if connected.

(d) Next, the user is instructed to turn the laser unit under test 9 on if required (step 708). Said instruction may be from prior training of the user or may be displayed on the screen of local computer 2 if connected.

(e) Next, the user is instructed to point the output of the laser unit under test 9 at the optical interface stand 11 interfaced to the test head(s) and to re-orient the laser unit under test 9 in relation to said optics 11 until the "Power/Aiming" indicator of the certification unit 1 turns green (step 710). Said instruction may be from prior training of the user or may be displayed on the screen of local computer 2 if connected.

(f) Next, the Pulse Characterization Test Head samples the pulses in the output 10*a* of the laser unit under test 9 and performs an analysis, previously described, to determine if a "double pulse" condition exists (step 712).

(g) Next, the result of said analysis is presented to the user (step 714). If said analysis indicates that double pulses exist (step 716) the laser unit under test 9 fails certification (step 724). The "Double Pulse" test is then concluded at step 726 and no further testing takes place; otherwise, (h) If no double pulses are indicated the user records this result (step 718). Said recording may be made manually by the user or automatically by the local computer 2 if connected.

(i) It is next determined if the "Double Pulse" test is to be repeated at another, different power supply voltage (step 720). Said determination may be made manually by the user or automatically by local computer 2 if connected. If the determination is to repeat the test at another, different power supply voltage, execution of the test returns to step 706.

(j) When the "Double Pulse" test has been successfully concluded at all desired power supply voltages the laser unit under test 9 is considered to have passed the "Double Pulse" test and is eligible to continue the test process (step 722). The "Double Pulse" test is then concluded at step 726.

Figure 11:
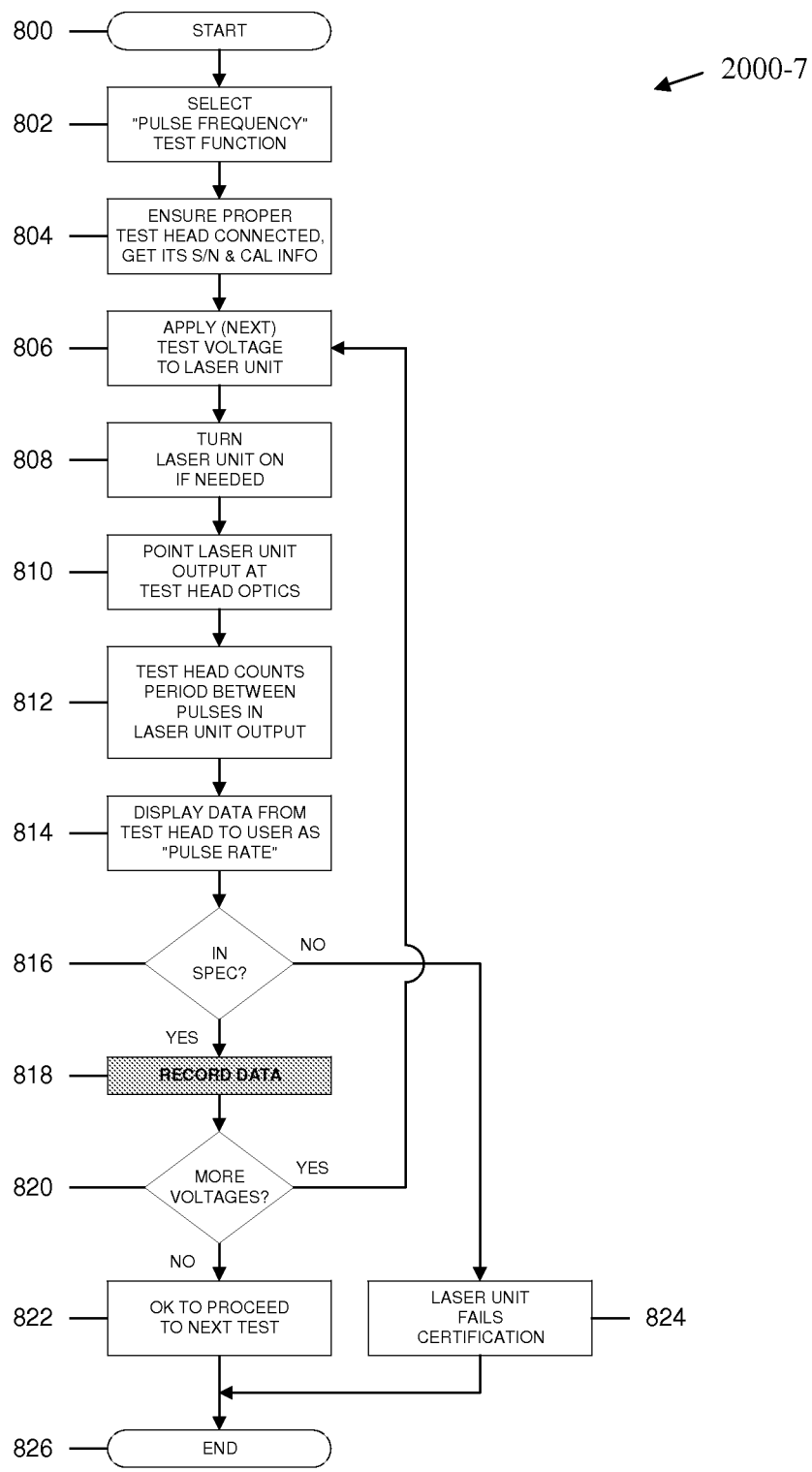
FIG. 11 is a flow chart of a "pulse frequency" verification test according to an aspect of the invention.

FIG. 11 shows a flow chart 2000-7 of a "Pulse Frequency" test that may be applied to laser unit under test 9 and, which may comprise some or all of the following general sequence of actions according to a non-limiting, exemplary aspect of the invention.

(a) First, certification unit 1 is placed in an operating mode whose primary purpose is to conduct a Pulse Frequency Test (step 802). Said mode selection may be accomplished via user select switches 19 of the certification unit 1 or via commands from local computer 2 if connected.

(b) Next, the user is instructed to connect the "Pulse Characterization Test Head" (not shown) to the certification unit 1 and the test does not proceed until connection of the proper test head is detected (step 804). Said instruction may be from prior training of the user or may be displayed on the screen of local computer 2 if connected. Also as part of step 804, the certification unit 1 may retrieve the serial number and calibration information of the test head and retain it locally for later use or may transmit the information to local computer 2 if connected.

(c) Next, certification unit 1 may, as necessary, apply a specified voltage to receptacle 15 for use by the laser unit under test 9 (step 806). Said voltage may be specified via user select switches 19 of the certification unit 1 or via commands from local computer 2 if connected.

(d) Next, the user is instructed to turn the laser unit under test 9 on if required (step 808). Said instruction may be from prior training of the user or may be displayed on the screen of local computer 2 if connected.

(e) Next, the user is instructed to point the output of the laser unit under test 9 at the optical interface stand 11 of the test head(s) and to re-orient the laser unit under test 9 in relation to said optics 11 until the "Power/Aiming" indicator of the certification unit 1 turns green (step 810). Said instruction may be from prior training of the user or may be displayed on the screen of local computer 2 if connected.

(f) Next, the Pulse Characterization Test Head samples the pulses in the output 10*a* of the laser unit under test 9 and performs an analysis, previously described, to determine the pulse frequency of the output 10*a* of the laser unit under test 9.

(g) Next, the measured pulse frequency is presented to the user (step 814). Said presentation may be via display 20 of the certification unit 1 or via the screen of local computer 2 if connected.

(h) Next, a comparison is made between said presented pulse frequency and the pulse frequency at which the laser unit under test 9 is specified to operate (step 816). If said presented pulse frequency is not within a predetermined and proper range of the pulse frequency at which the laser unit under test 9 is specified to operate, the laser unit under test 9 fails certification (step 824). The "Pulse Frequency" test is then concluded at step 826 and no further testing takes place; otherwise, (i) If said presented pulse frequency is within said predetermined and proper range of the pulse frequency at which the laser unit under test 9 is specified to operate, the user records this result (step 818). Said recording may be made manually by the user or automatically by the local computer 2 if connected.

(j) It is next determined if the "Pulse Frequency" test is to be repeated at another different power supply voltage (step 820). Said determination may be made manually by the user or automatically by local computer 2 if connected. If the determination is to repeat the test at another different power supply voltage, execution of the test returns to step 806.

(k) When the "Pulse Frequency" test has been successfully concluded at all desired power supply voltages, the laser unit under test 9 is considered to have passed the "Pulse Frequency" test and is eligible to continue the test process (step 822). The "Pulse Frequency" test is then concluded at step 826.

Figure 12:
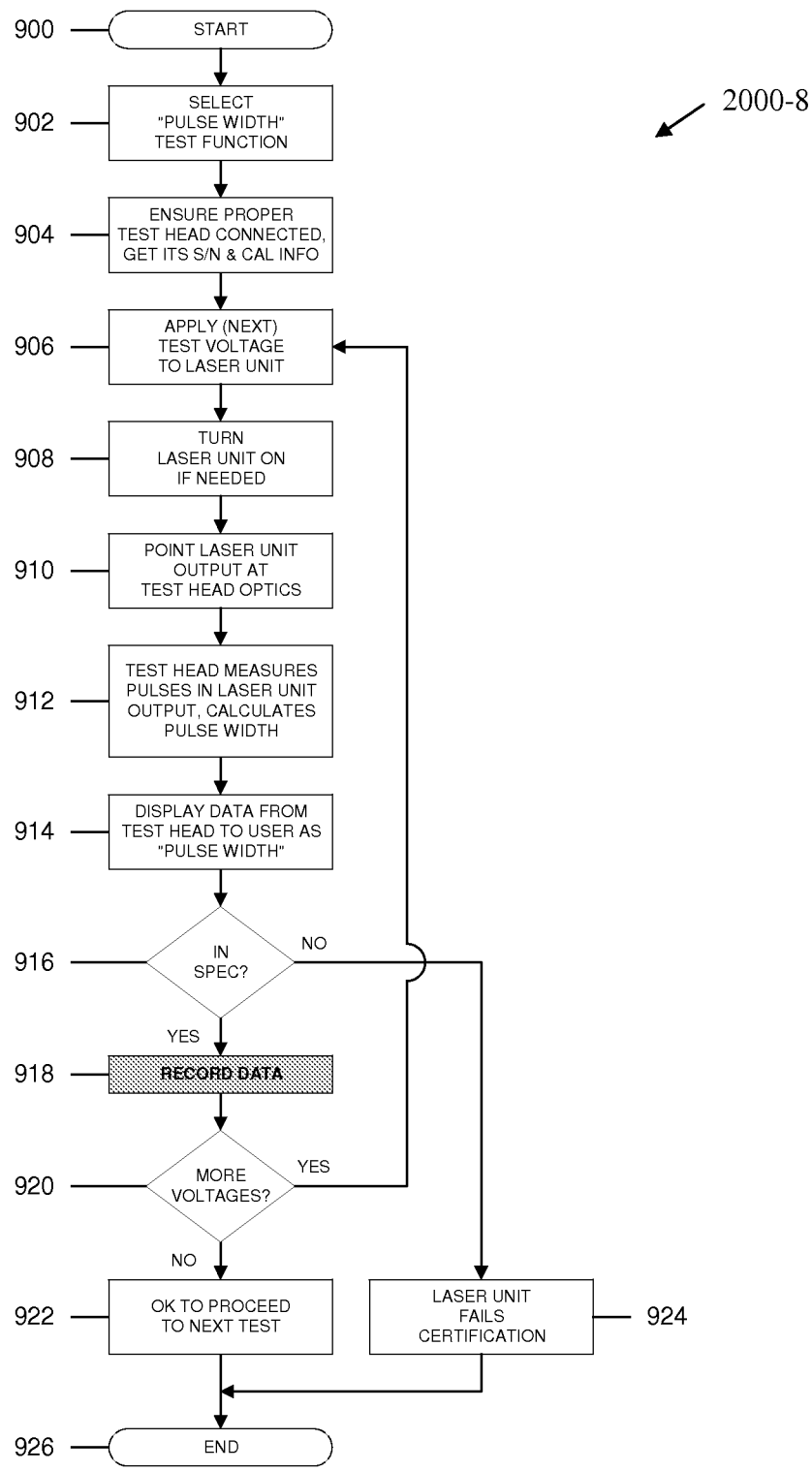
FIG. 12 is a flow chart of a "pulse width" verification test according to an aspect of the invention.

FIG. 12 shows a flow chart 2000-8 of a "Pulse Width" test that may be applied to laser unit under test 9 and, which may comprise some or all of the following general sequence of actions according to a non-limiting, exemplary aspect of the invention.

(a) First, certification unit 1 is placed in an operating mode whose primary purpose is to conduct a Pulse Width Test (step 902). Said mode selection may be accomplished via user select switches 19 of the certification unit 1 or via commands from local computer 2 if connected.

(b) Next, the user is instructed to connect the "Pulse Characterization Test Head" (not shown) to the certification unit 1 and the test does not proceed until connection of the proper test head is detected (step 904). Said instruction may be from prior training of the user or may be displayed on the screen of local computer 2 if connected. Also as part of step 904, the certification unit 1 may retrieve the serial number and calibration information of the test head and retain it locally for later use or may transmit the information to local computer 2 if connected.

(c) Next, certification unit 1 may, as necessary, apply a specified voltage to receptacle 15 for use by the laser unit under test 9 (step 906). Said voltage may be specified via user select switches 19 of the certification unit 1 or via commands from local computer 2 if connected.

(d) Next, the user is instructed to turn the laser unit under test 9 on if required (step 908). Said instruction may be from prior training of the user or may be displayed on the screen of local computer 2 if connected.

(e) Next, the user is instructed to point the output of the laser unit under test 9 at the optical interface stand 11 interfaced to the test head(s) and to re-orient the laser unit under test 9 in relation to said optics 11 until the "Power/Aiming" indicator of the certification unit 1 turns green (step 910). Said instruction may be from prior training of the user or may be displayed on the screen of local computer 2 if connected.

(f) Next, the Pulse Characterization Test Head samples the pulses in the output 10a of the laser unit under test 9 and performs an analysis, previously described, to determine the pulse width of the output 10a of the laser unit under test 9 (step 912).

(g) Next, the measured pulse width is presented to the user (step 914). Said presentation may be via display 20 of the certification unit 1 or via the screen of local computer 2 if connected.

(h) Next, a comparison is made between said presented pulse width and the pulse width at which the laser unit under test 9 is specified to operate (step 916). If said presented pulse width is not within a predetermined and proper range of the pulse width at which the laser unit under test 9 is specified to operate, the laser unit under test 9 fails certification (step 924). The "Pulse Width" test is then concluded at step 926 and no further testing takes place; otherwise, (i) If said presented pulse width is within said predetermined and proper range of the pulse width at which the laser unit under test 9 is specified to operate, the user records this result (step 918). Said recording may be made manually by the user or automatically by the local computer 2 if connected.

(j) It is next determined if the "Pulse Width" test is to be repeated at another different power supply voltage (step 920). Said determination may be made manually by the user or automatically by local computer 2 if connected. If the determination is to repeat the test at another different power supply voltage, execution of the test returns to step 906.

(k) When the "Pulse Width" test has been successfully concluded at all desired power supply voltages the laser unit under test 9 is considered to have passed the "Pulse Width" test and is eligible to continue the test process (step 922). The "Pulse Width" test is then concluded at step 926.

Figure 13:
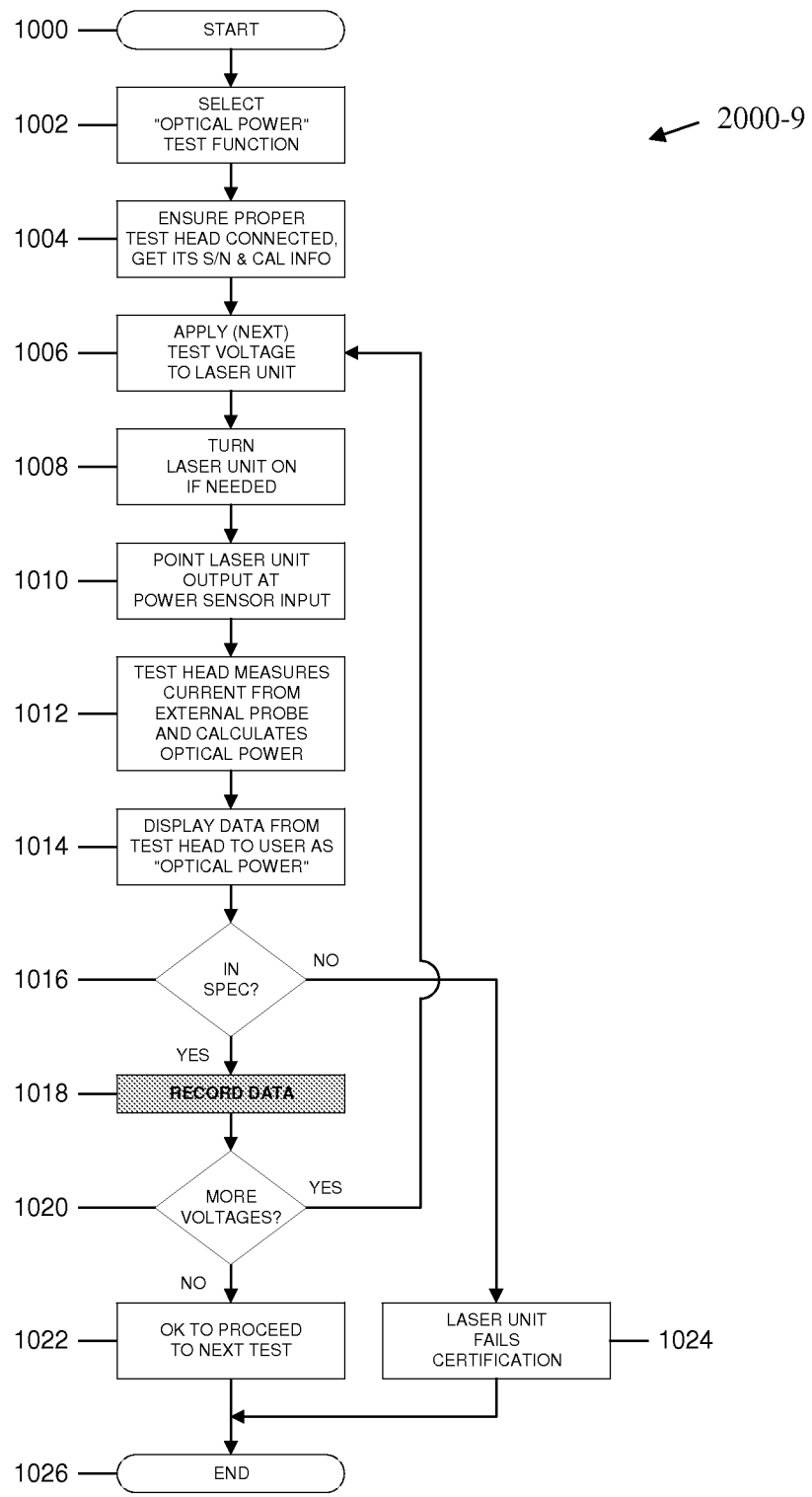
FIG. 13 is a flow chart of an "optical power" verification test according to an aspect of the invention.

FIG. 13 shows a flow chart 2000-9 of an "Optical Power" test that may be applied to laser unit under test 9 and, which may comprise some or all of the following general sequence of actions according to a non-limiting, exemplary aspect of the invention.

(a) First, certification unit 1 is placed in an operating mode whose primary purpose is to conduct an Optical Power Test (step 1002). Said mode selection may be accomplished via user select switches 19 of the certification unit 1 or via commands from local computer 2 if connected.

(b) Next, the user is instructed to connect the "Optical Power Test Head" (not shown) to the certification unit 1 and the test does not proceed until connection of the proper test head is detected (step 1004). Said instruction may be from prior training of the user or may be displayed on the screen of local computer 2 if connected. Also as part of step 1004, the certification unit 1 may retrieve the serial number and calibration information of the test head and retain it locally for later use or may transmit the information to local computer 2 if connected.

(c) Next, certification unit 1 may, as necessary, apply a specified voltage to receptacle 15 for use by the laser unit under test 9 (step 1006). Said voltage may be specified via user select switches 19 of the certification unit 1 or via commands from local computer 2 if connected.

(d) Next, the user is instructed to turn the laser unit under test 9 on if required (step 1008). Said instruction may be from prior training of the user or may be displayed on the screen of local computer 2 if connected.

(e) Next, the user is instructed to point the output of the laser unit under test 9 at the input of the external power sensor 104 (see FIG. 3e) attached to the test head and to re-orient the laser unit under test 9 in relation to said power sensor until the "Power/Aiming" indicator of the certification unit 1 turns green (step 1010). Said instruction may be from prior training of the user or may be displayed on the screen of local computer 2 if connected.

(f) Next, the Optical Power Test Head measures the current from said power sensor and performs an analysis, previously described, to determine the optical power of the output 10a of the laser unit under test 9 (step 1012).

(g) Next, the measured optical power is presented to the user (step 1014). Said presentation may be via display 20 of the certification unit 1 or via the screen of local computer 2 if connected.

(h) Next, a comparison is made between said presented optical power and the optical power at which the laser unit under test 9 is specified to operate (step 1016). If said presented optical power is not within a predetermined and proper range of the optical power at which the laser unit under test 9 is specified to operate, the laser unit under test 9 fails certification (step 1024). The "Optical Power" test is then concluded at step 1026 and no further testing takes place; otherwise, (i) If said presented optical power is within said predetermined and proper range of the optical power at which the laser unit under test 9 is specified to operate, the user records this result (step 1018). Said recording may be made manually by the user or automatically by the local computer 2 if connected.

(j) It is next determined if the "Optical Power" test is to be repeated at another different power supply voltage (step 1020). Said determination may be made manually by the user or automatically by local computer 2 if connected. If the determination is to repeat the test at another different power supply voltage, execution of the test returns to step 1006.

(k) When the "Optical Power" test has been successfully concluded at all desired power supply voltages the laser unit under test 9 is considered to have passed the "Optical Power" test and is eligible to continue the test process (step 1022). The "Optical Power" test is then concluded at step 1026.

Figure 14:
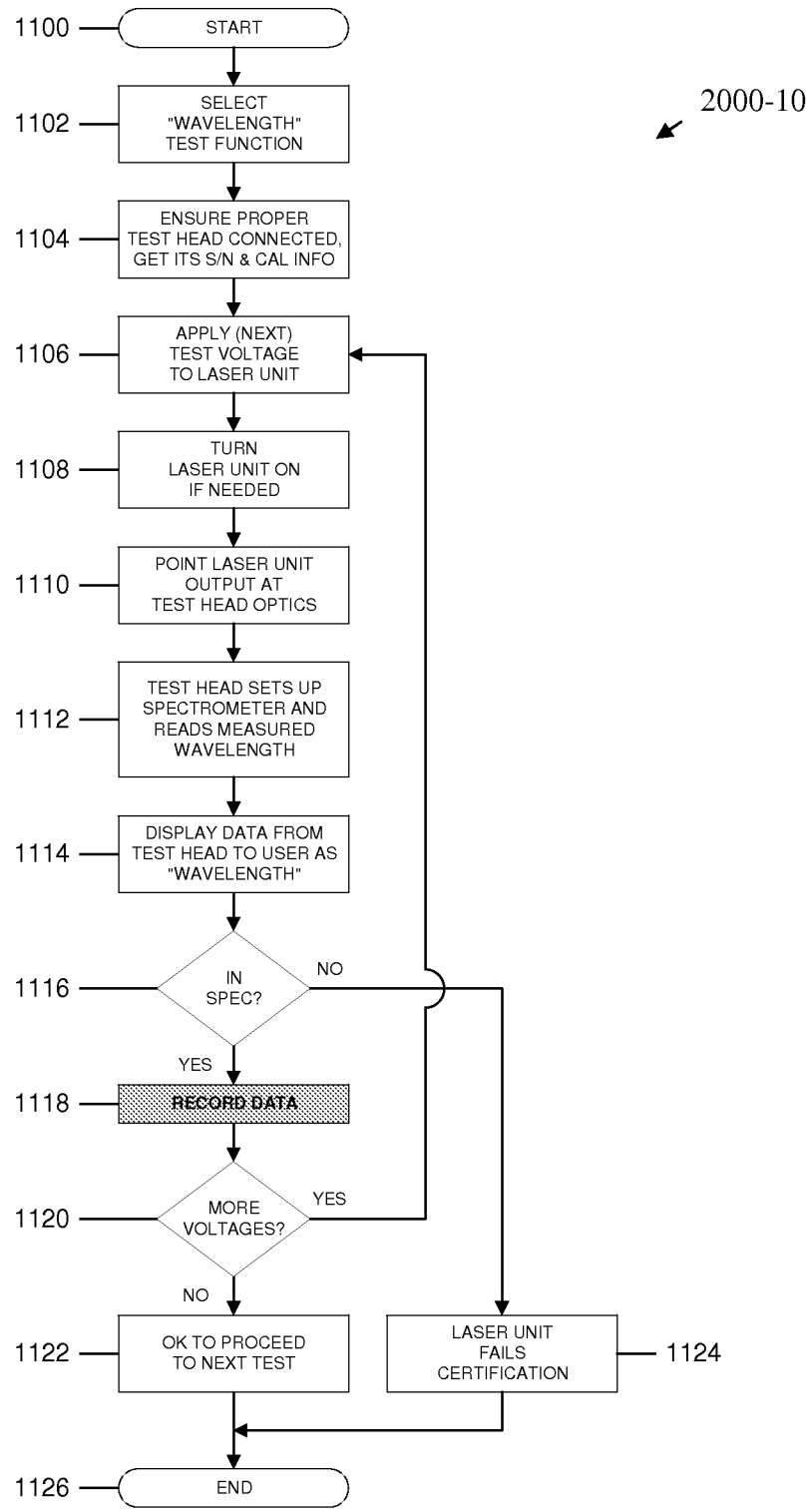
FIG. 14 is a flow chart of a "wavelength" verification test according to an aspect of the invention.

FIG. 14 shows a flow chart 2000-10 of a "Wavelength" test that may be applied to laser unit under test 9 and, which may comprise some or all of the following general sequence of actions according to a non-limiting, exemplary aspect of the invention.

(a) First, certification unit 1 is placed in an operating mode whose primary purpose is to conduct a Wavelength Test (step 1102). Said mode selection may be accomplished via user select switches 19 of the certification unit 1 or via commands from local computer 2 if connected.

(b) Next, the user is instructed to connect the "Wavelength Test Head" (not shown) to the certification unit 1 and the test does not proceed until connection of the proper test head is detected (step 1104). Said instruction may be from prior training of the user or may be displayed on the screen of local computer 2 if connected. Also as part of step 1104, the certification unit 1 may retrieve the serial number and calibration information of the test head and retain it locally for later use or may transmit the information to local computer 2 if connected.

(c) Next, certification unit 1 may, as necessary, apply a specified voltage to receptacle 15 for use by the laser unit under test 9 (step 1106). Said voltage may be specified via user select switches 19 of the certification unit 1 or via commands from local computer 2 if connected.

(d) Next, the user is instructed to turn the laser unit under test 9 on if required (step 1108). Said instruction may be from prior training of the user or may be displayed on the screen of local computer 2 if connected.

(e) Next, the user is instructed to point the output of the laser unit under test 9 at the optical interface stand 11 interfaced to the test head(s) and to re-orient the laser unit under test 9 in relation to said optics 11 until the "Power/Aiming" indicator of the certification unit 1 turns green (step 1110). Said instruction may be from prior training of the user or may be displayed on the screen of local computer 2 if connected.

(f) Next, the Wavelength Test Head performs any necessary setup and communication tasks related to the spectrometer 64 (see FIG. 3*c*) and then performs an analysis, previously described, to determine the operating wavelength of the output 10*a* of the laser unit under test 9 (step 1112).

(g) Next, the measured wavelength is presented to the user (step 1114). Said presentation may be via display 20 of the certification unit 1 or via the screen of local computer 2 if connected.

(h) Next, a comparison is made between said presented wavelength and the wavelength at which the laser unit under test 9 is specified to operate (step 1116). If said presented wavelength is not within a predetermined and proper range of the wavelength at which the laser unit under test 9 is specified to operate, the laser unit under test 9 fails certification (step 1124). The "Wavelength" test is then concluded at step 1126 and no further testing takes place; otherwise, (i) If said presented wavelength is within said predetermined and proper range of the wavelength at which the laser unit under test 9 is specified to operate, the user records this result (step 1118). Said recording may be made manually by the user or automatically by the local computer 2 if connected.

(j) It is next determined if the "Wavelength" test is to be repeated at another, different power supply voltage (step 1120). Said determination may be made manually by the user or automatically by local computer 2 if connected. If the determination is to repeat the test at another, different power supply voltage, execution of the test returns to step 1106.

(k) When the "Wavelength" test has been successfully concluded at all desired power supply voltages the laser unit under test 9 is considered to have passed the "Wavelength" test and is eligible to continue the test process (step 1122). The "Wavelength" test is then concluded at step 1126.

Figure 15:
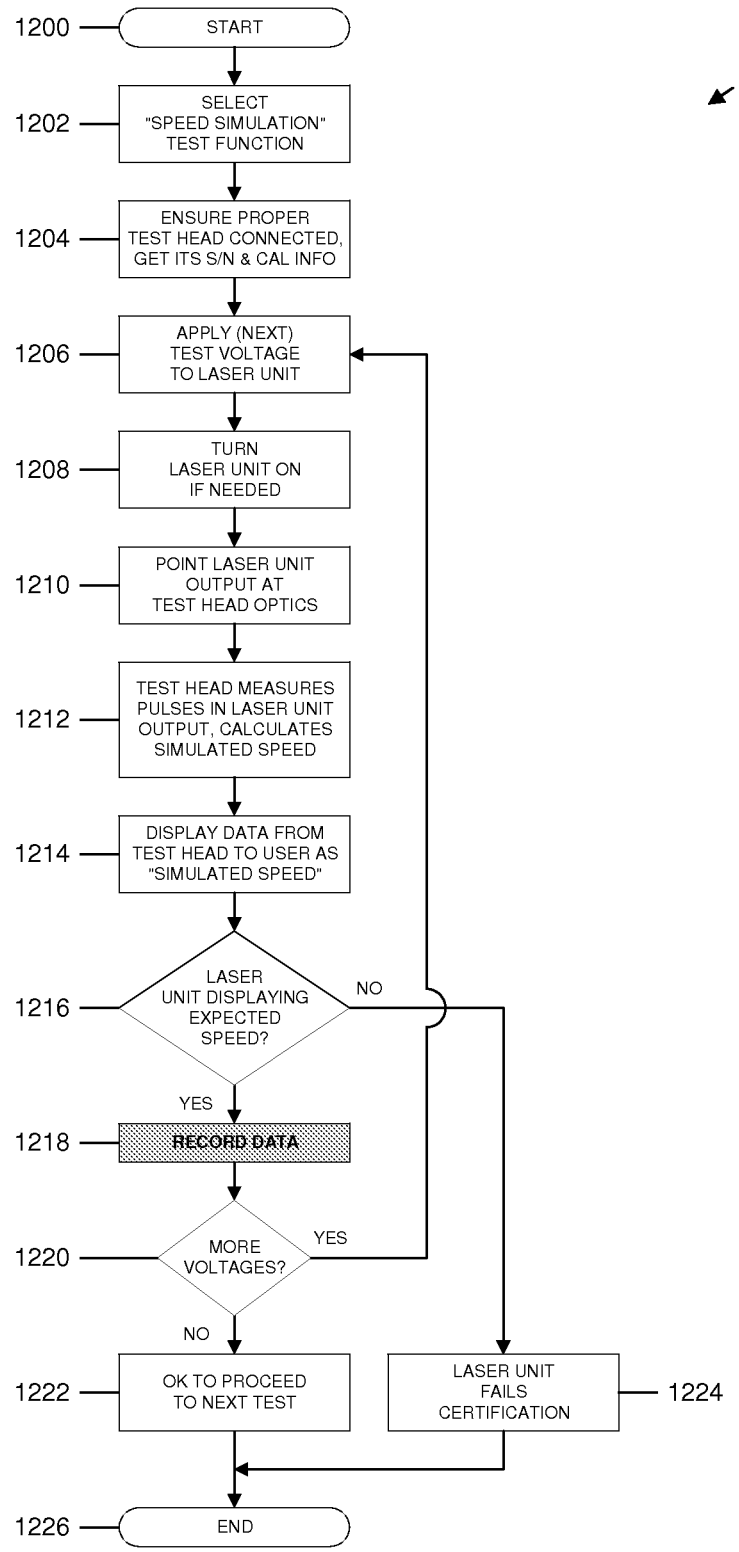
FIG. 15 is a flow chart of a "speed simulation" verification test according to an aspect of the invention.

FIG. 15 shows a flow chart 2000-11 of a "Speed Simulation" test that may be applied to laser unit under test 9 and, which may comprise some or all of the following general sequence of actions according to a non-limiting, exemplary aspect of the invention.

(a) First, certification unit 1 is placed in an operating mode whose primary purpose is to conduct a Speed Simulation Test (step 1202). Said mode selection may be accomplished via user select switches 19 of the certification unit 1 or via commands from local computer 2 if connected.

(b) Next, the user is instructed to connect the "Speed Simulation Test Head" (not shown) to the certification unit 1 and the test does not proceed until connection of the proper test head is detected (step 1204). Said instruction may be from prior training of the user or may be displayed on the screen of local computer 2 if connected. Also as part of step 1204, the certification unit 1 may retrieve the serial number and calibration information of the test head and retain it locally for later use or may transmit the information to local computer 2 if connected.

(c) Next, certification unit 1 may, as necessary, apply a specified voltage to receptacle 15 for use by the laser unit under test 9 (step 1206). Said voltage may be specified via user select switches 19 of the certification unit 1 or via commands from local computer 2 if connected.

(d) Next, the user is instructed to turn the laser unit under test 9 on if required (step 1208). Said instruction may be from prior training of the user or may be displayed on the screen of local computer 2 if connected.

(e) Next, the user is instructed to point the output of the laser unit under test 9 at the optical interface stand 11 interfaced to the test head(s) and to re-orient the laser unit under test 9 in relation to said optics 11 until the "Power/Aiming" indicator of the certification unit 1 turns green (step 1210). Said instruction may be from prior training of the user or may be displayed on the screen of local computer 2 if connected.

(f) Next, the Speed Simulation Test Head measures the pulses in the output 10a of the laser unit under test 9 and performs calculations as previously described to control a laser, in a fashion previously described, thereby producing a return signal, also previously described, which is directed to the laser unit under test 9 as an input signal 10b (step 1212).

(g) Next, an "expected speed" is presented to the user (step 1214). Said presentation may be via display 20 of the certification unit 1 or via the screen of local computer 2 if connected.

(h) Next, the user is instructed to compare the speed displayed by the laser unit under test 9 to the "expected speed" that was presented to the user in step 1214. Said instruction may be from prior training of the user or may be displayed on the screen of local computer 2 if connected. If the result of said comparison is that the speed displayed by the laser unit under test 9 is not within a specified range of the aforementioned "expected speed," the laser unit under test 9 fails certification (step 1224). The "Speed Simulation" test is then concluded at step 1226 and no further testing takes place; otherwise, (i) If said comparison indicates that the speed displayed by the laser unit under test 9 is within a specified range of the aforementioned "expected speed," the user records this result along with the actual speed displayed by the laser unit under test 9 (step 1218). Said recording may be made manually by the user or automatically by the local computer 2 if connected.

(j) It is next determined if the "Speed Simulation" test is to be repeated at another, different power supply voltage (step 1220). Said determination may be made manually by the user or automatically by local computer 2 if connected. If the determination is to repeat the test at another, different power supply voltage, execution of the test returns to step 1206.

(k) When the "Speed Simulation" test has been successfully concluded at all desired power supply voltages, the laser unit under test 9 is considered to have passed the "Speed Simulation" test and is eligible to continue the test process (step 1222). The "Speed Simulation" test is then concluded at step 1226.

Figure 16:
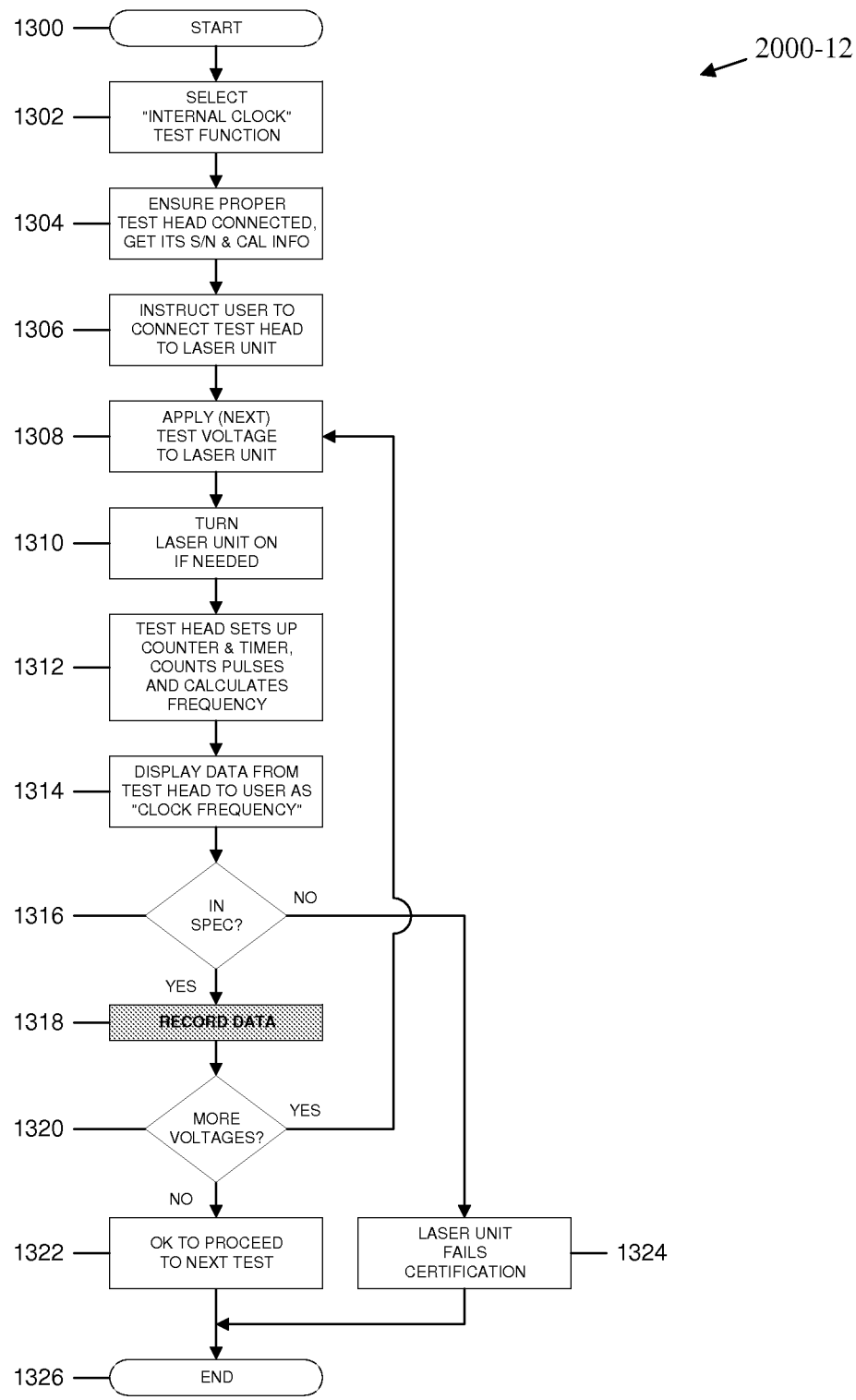
FIG. 16 is a flow chart of an "internal clock frequency" verification test according to an aspect of the invention.

FIG. 16 shows a flow chart 2000-12 of an "Internal Clock Frequency" test that may be applied to laser unit under test 9 and, which may comprise some or all of the following general sequence of actions according to a non-limiting, exemplary aspect of the invention.

(a) First, certification unit 1 is placed in an operating mode whose primary purpose is to conduct an Internal Clock Frequency Test (step 1302). Said mode selection may be accomplished via user select switches 19 of the certification unit 1 or via commands from local computer 2 if connected.

(b) Next, the user is instructed to connect the "Internal Clock Frequency Test Head" (not shown) to the certification unit 1 and the test does not proceed until connection of the proper test head is detected (step 1304). Said instruction may be from prior training of the user or may be displayed on the screen of local computer 2 if connected. Also as part of step 1304, the certification unit 1 may retrieve the serial number and calibration information of the test head and retain it locally for later use or may transmit the information to local computer 2 if connected.

(c) Next, the user is instructed to connect the probe of the "Internal Clock Frequency Test Head" (not shown) to the laser unit under test 9 (step 1306). Said instruction may be from prior training of the user or may be displayed on the screen of local computer 2 if connected.

(d) Next, certification unit 1 may, as necessary, apply a specified voltage to receptacle 15 for use by the laser unit under test 9 (step 1308). Said voltage may be specified via user select switches 19 of the certification unit 1 or via commands from local computer 2 if connected.

(e) Next, the user is instructed to turn the laser unit under test 9 on if required (step 1310). Said instruction may be from prior training of the user or may be displayed on the screen of local computer 2 if connected.

(f) Next, the Internal Clock Frequency Test Head samples the pulses in the clock signal 164 of the laser unit under test 9 and performs an analysis, previously described, to determine the frequency of the clock signal 164 of the laser unit under test 9 (step 1312).

(g) Next, the measured frequency is presented to the user (step 1314). Said presentation may be via display 20 of the certification unit 1 or via the screen of local computer 2 if connected.

(h) Next, a comparison is made between said presented frequency and the frequency at which the internal clock of laser unit under test 9 is specified to operate (step 1316). If said presented frequency is not within a predetermined and proper range of the clock frequency at which the laser unit under test 9 is specified to operate the laser unit under test 9 fails certification (step 1324). The "Internal Clock Frequency" test is then concluded at step 1326 and no further testing takes place; otherwise, (i) If said presented frequency is within said predetermined and proper range of the clock frequency at which the laser unit under test 9 is specified to operate, the user records this result (step 1318). Said recording may be made manually by the user or automatically by the local computer 2 if connected.

(j) It is next determined if the "Internal Clock Frequency" test is to be repeated at another, different power supply voltage (step 1320). Said determination may be made manually by the user or automatically by local computer 2 if connected. If the determination is to repeat the test at another, different power supply voltage, execution of the test returns to step 1308.

(k) When the "Internal Clock Frequency" test has been successfully concluded at all desired power supply voltages, the laser unit under test 9 is considered to have passed the "Internal Clock Frequency" test and is eligible to continue the test process (step 1322). The "Internal Clock Frequency" test is then concluded at step 1326.

Figure 17:
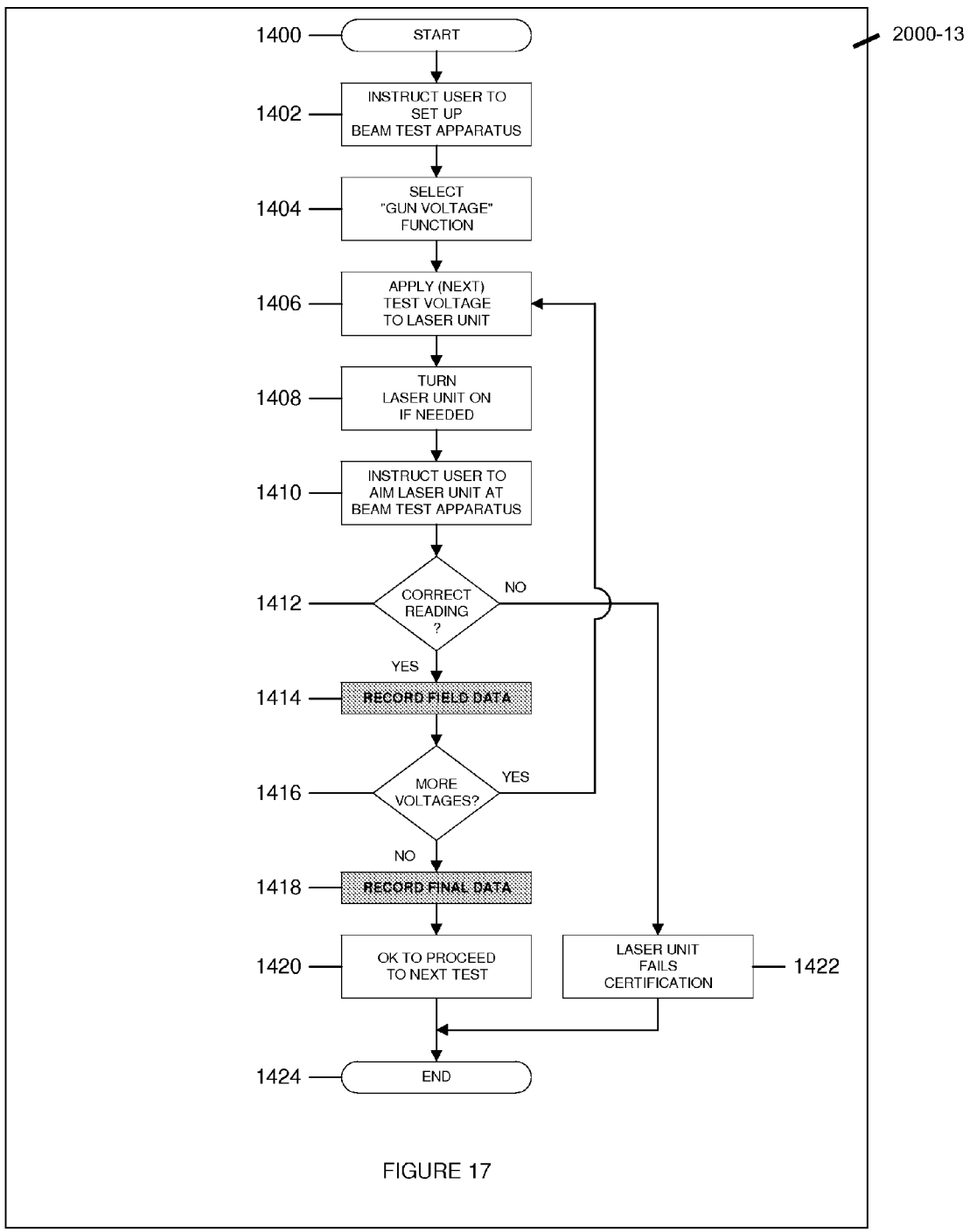
FIG. 17 is a flow chart of a "horizontal beam width" verification test according to an aspect of the invention.

FIG. 17 shows a flow chart 2000-13 of a "Horizontal Beam Width" test that may be applied to laser unit under test 9 and, which may comprise some or all of the following general sequence of actions according to a non-limiting, exemplary aspect of the invention.

(a) First, the user is instructed to set up the Beam Test Apparatus (step 1402). Said instruction may be from prior training of the user or may be displayed on the screen of local computer 2 if connected. The Beam Test Apparatus, not shown, consists of three retro-reflective discs which are of a size and relative placement that satisfies the requirements set forth by the International Association of Chiefs of Police (IACP) for beam characteristics testing. The Beam Test Apparatus is required to be placed at a physical location such that the center target is at a distance of typically 202.5 feet from the user. The skilled person will appreciate that other distances as mathematically determined may be used for the test stand location.

(b) Next, certification unit 1 is placed in an operating mode whose primary purpose is only to vary the power supply voltage to the laser unit under test 9 (step 1404). Said mode selection may be accomplished via user select switches 19 of the certification unit 1 or via commands from local computer 2 if connected.

(c) Next, certification unit 1 may, as necessary, apply a specified voltage to receptacle 15 for use by the laser unit under test 9 (step 1406). Said voltage may be specified via user select switches 19 of the certification unit 1 or via commands from local computer 2 if connected.

(d) Next, the user is instructed to turn the laser unit under test 9 on if required (step 1408). Said instruction may be from prior training of the user or may be displayed on the screen of local computer 2 if connected. The certification unit 1 may retrieve the serial number and calibration information of the test head and retain it locally for later use or may transmit the information to local computer 2 if connected.

(e) Next, the user is instructed to hold the laser unit under test 9 in an upright position (e.g. in its normal operating orientation), aim it so that the reticule of the laser unit under test 9 is pointed at the center target of the Beam Test Apparatus and then, to observe the measured distance reported by the laser unit under test 9 (step 1410).

(f) If the measured distance reported by the laser unit under test 9 does not match the known distance to the center target of the beam test apparatus (step 1412) the laser unit under test 9 fails certification (step 1422). The "Horizontal Beam Width" test is then concluded at step 1424 and no further testing takes place; otherwise, (g) If the measured distance reported by the laser unit under test 9 matches the known distance to the center target of the beam test apparatus, the user records this result (step 1414). Since this test is typically conducted outdoors, away from the test bench, users may elect to test several laser guns in a "batch" mode and manually record the results at this point for later entry into the local computer 2.

(h) It is next determined if the "Horizontal Beam Width" test is to be repeated at another, different power supply voltage (step 1416). Said determination may be made manually by the user or automatically by local computer 2 if connected. If the determination is to repeat the test at another, different power supply voltage, execution of the test returns to step 1406.

(i) When the "Horizontal Beam Width" test has been successfully concluded at all desired power supply voltages the laser unit under test 9 is considered to have passed the "Horizontal Beam Width" test. Since this test is typically conducted outdoors, away from the test bench, users may elect to test several laser guns in a "batch" mode and manually record their results; and, after all laser units are tested enter said results into the local computer 2 (step 1418) in a "batch" mode as well. Regardless of when or how data entry is accomplished, the laser unit under test 9 is eligible to continue the test process (step 1420) and the "Horizontal Beam Width" test is considered to be concluded at step 1424.

Figure 18:
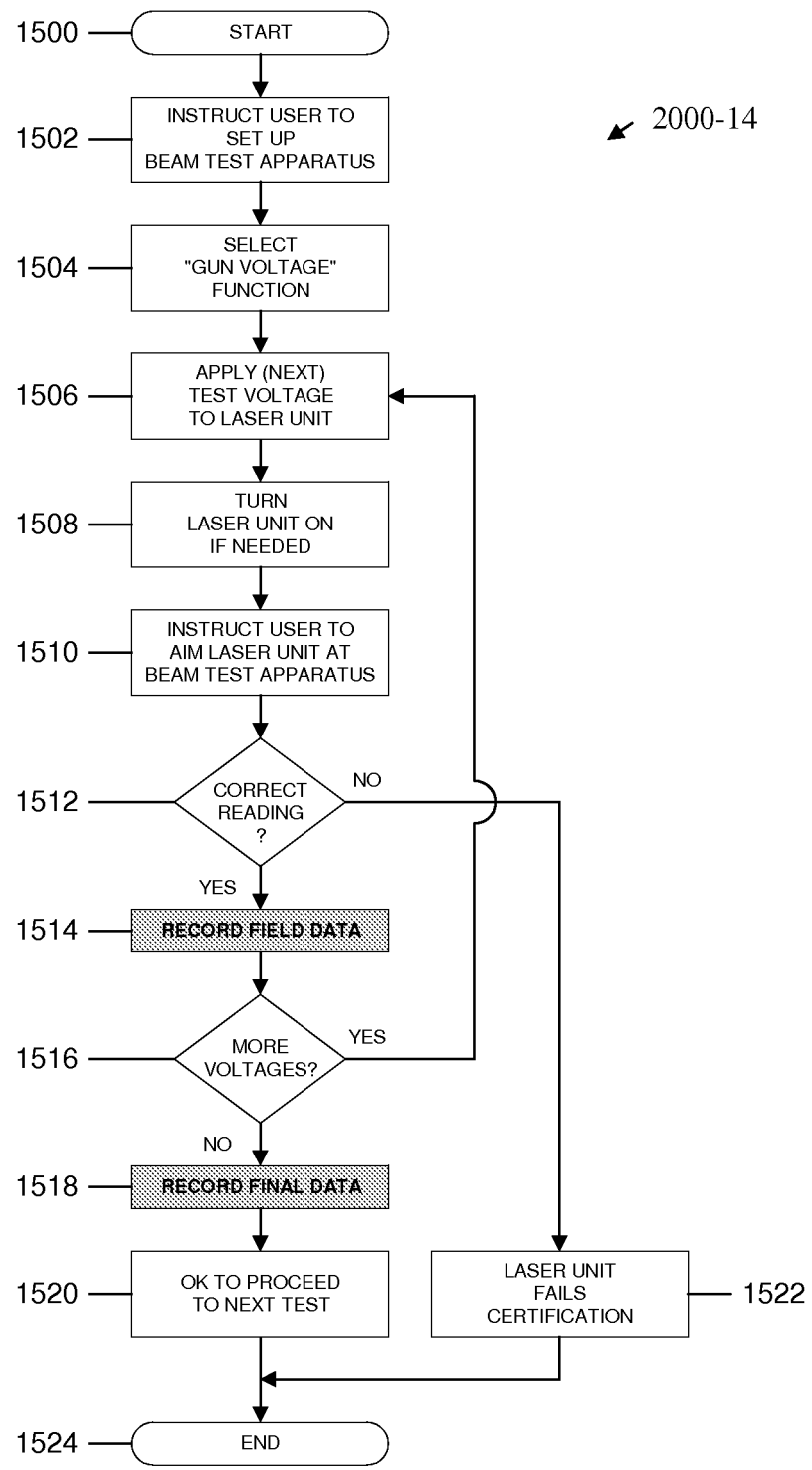
FIG. 18 is a flow chart of a "vertical beam width" verification test according to an aspect of the invention.

FIG. 18 shows a flow chart 2000-14 of a "Vertical Beam Width" test that may be applied to laser unit under test 9 and, which may comprise some or all of the following general sequence of actions according to a non-limiting, exemplary aspect of the invention.

(a) First, the user is instructed to set up the Beam Test Apparatus (step 1502). Said instruction may be from prior training of the user or may be displayed on the screen of local computer 2 if connected. The Beam Test Apparatus, not shown, consists of three retro-reflective discs which are of a size and relative placement that satisfies the requirements set forth by the International Association of Chiefs of Police (IACP) for beam characteristics testing. The Beam Test Apparatus is required to be placed at a physical location such that the center target is at a distance of typically 202.5 feet from the user. The skilled person will appreciate that other distances as mathematically determined may be used for the test stand location.

(b) Next, certification unit 1 is placed in an operating mode whose primary purpose is only to vary the power supply voltage to the laser unit under test 9 (step 1504). Said mode selection may be accomplished via user select switches 19 of the certification unit 1 or via commands from local computer 2 if connected.

(c) Next, certification unit 1 may, as necessary, apply a specified voltage to receptacle 15 for use by the laser unit under test 9 (step 1506). Said voltage may be specified via user select switches 19 of the certification unit 1 or via commands from local computer 2 if connected.

(d) Next, the user is instructed to turn the laser unit under test 9 on if required (step 1508). Said instruction may be from prior training of the user or may be displayed on the screen of local computer 2 if connected.

(e) Next, the user is instructed to hold the laser unit under test 9 in a horizontal position (e.g. at a right angle to its normal operating orientation), aim it so that the reticule of the laser unit under test 9 is pointed at the center target of the Beam Test Apparatus and then, to observe the measured distance reported by the laser unit under test 9 (step 1510).

(f) If the measured distance reported by the laser unit under test 9 does not match the known distance to the center target of the beam test apparatus (step 1512) the laser unit under test 9 fails certification (step 1522). The "Vertical Beam Width" test is then concluded at step 1524 and no further testing takes place; otherwise, (g) If the measured distance reported by the laser unit under test 9 matches the known distance to the center target of the beam test apparatus, the user records this result (step 1514). Since this test is typically conducted outdoors away from the test bench, users may elect to test several laser guns in a "batch" mode and manually record the results at this point for later entry into the local computer 2.

(h) It is next determined if the "Vertical Beam Width" test is to be repeated at another, different power supply voltage (step 1516). Said determination may be made manually by the user or automatically by local computer 2 if connected. If the determination is to repeat the test at another, different power supply voltage, execution of the test returns to step 1506.

(i) When the "Vertical Beam Width" test has been successfully concluded at all desired power supply voltages the laser unit under test 9 is considered to have passed the "Vertical Beam Width" test. Since this test is typically conducted outdoors away from the test bench, users may elect to test several laser guns in a "batch" mode and manually record their results; and, after all laser units are tested enter said results into the local computer 2 (step 1518) in a "batch" mode as well. Regardless of when or how data entry is accomplished, the laser unit under test 9 is eligible to continue the test process (step 1520) and the "Vertical Beam Width" test is considered to be concluded at step 1524.

Figure 19:
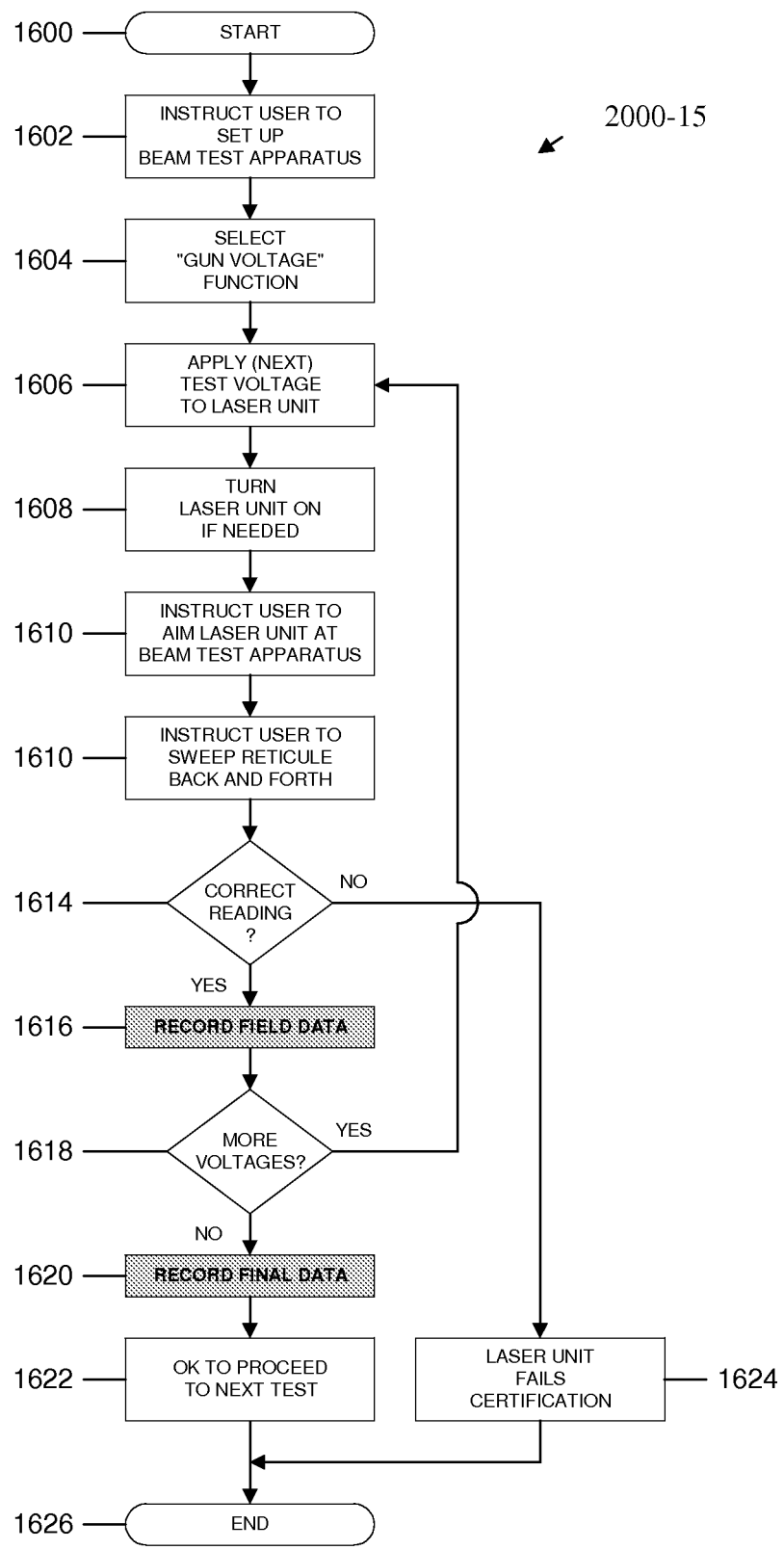
FIG. 19 is a flow chart of a "sight alignment" verification test according to an aspect of the invention.

FIG. 19 shows a flow chart 2000-15 of a "Sight Alignment" test that may be applied to laser unit under test 9 and, which may comprise some or all of the following general sequence of actions according to a non-limiting, exemplary aspect of the invention.

(a) First, the user is instructed to set up the Beam Test Apparatus (step 1602). Said instruction may be from prior training of the user or may be displayed on the screen of local computer 2 if connected. The Beam Test Apparatus, not shown, consists of three retro-reflective discs which are of a size and relative placement that satisfies the requirements set forth by the International Association of Chiefs of Police (IACP) for beam characteristics testing. The Beam Test Apparatus is required to be placed at a physical location such that the center target is at a distance of typically 202.5 feet from the user. The skilled person will appreciate that other distances as mathematically determined may be used for the test stand location.

(b) Next, certification unit 1 is placed in an operating mode whose primary purpose is only to vary the power supply voltage to the laser unit under test 9 (step 1604). Said mode selection may be accomplished via user select switches 19 of the certification unit 1 or via commands from local computer 2 if connected.

(c) Next, certification unit 1 may, as necessary, apply a specified voltage to receptacle 15 for use by the laser unit under test 9 (step 1606). Said voltage may be specified via user select switches 19 of the certification unit 1 or via commands from local computer 2 if connected.

(d) Next, the user is instructed to turn the laser unit under test 9 on if required (step 1608). Said instruction may be from prior training of the user or may be displayed on the screen of local computer 2 if connected.

(e) Next, the user is instructed to hold the laser unit under test 9 in an upright position (e.g. in its normal operating orientation), aim it so that the reticule of the laser unit under test 9 is pointed at the center target of the Beam Test Apparatus, and then, to observe the measured distance reported by the leaser unit under test 9 (step 1610).

(f) Next the user is instructed to "sweep" the reticule of the laser unit under test 9 back and forth across all three targets of the beam test apparatus (step 1612) and verify that the measured distance reported by the laser unit under test 9 changes as expected when it is pointed at each of the targets.

(g) If the measured distance reported by the laser unit under test 9 does not change as expected (step 1614) the laser unit under test 9 fails certification (step 1624). The "Sight Alignment" test is then concluded at step 1628 and no further testing takes place; otherwise, (h) If the measured distance reported by the laser unit under test 9 changes as expected, the user records this result (step 1616). Since this test is typically conducted outdoors away from the test bench, users may elect to test several laser guns in a "batch" mode and manually record the results at this point for later entry into the local computer 2.

(i) It is next determined if the "Sight Alignment" test is to be repeated at another, different power supply voltage (step 1618). Said determination may be made manually by the user or automatically by local computer 2 if connected. If the determination is to repeat the test at another, different power supply voltage, execution of the test returns to step 1606.

(j) When the "Sight Alignment" test has been successfully concluded at all desired power supply voltages the laser unit under test 9 is considered to have passed the "Sight Alignment" test. Since this test is typically conducted outdoors away from the test bench, users may elect to test several laser guns in a "batch" mode and manually record their results; and, after all laser units are tested enter said results into the local computer 2 (step 1620) in a "batch" mode as well. Regardless of when or how data entry is accomplished the laser unit under test 9 is eligible to continue the test process (step 1622), and the "Sight Alignment" test is considered to be concluded at step 1626.

The detailed description set forth above is directed to an apparatus embodiment and method embodiment used to test and measure the accuracy and performance of a laser speed gun, wherein the apparatus included modular, plug-and-play type test heads associated with various test measurements as described.

Figure 20:
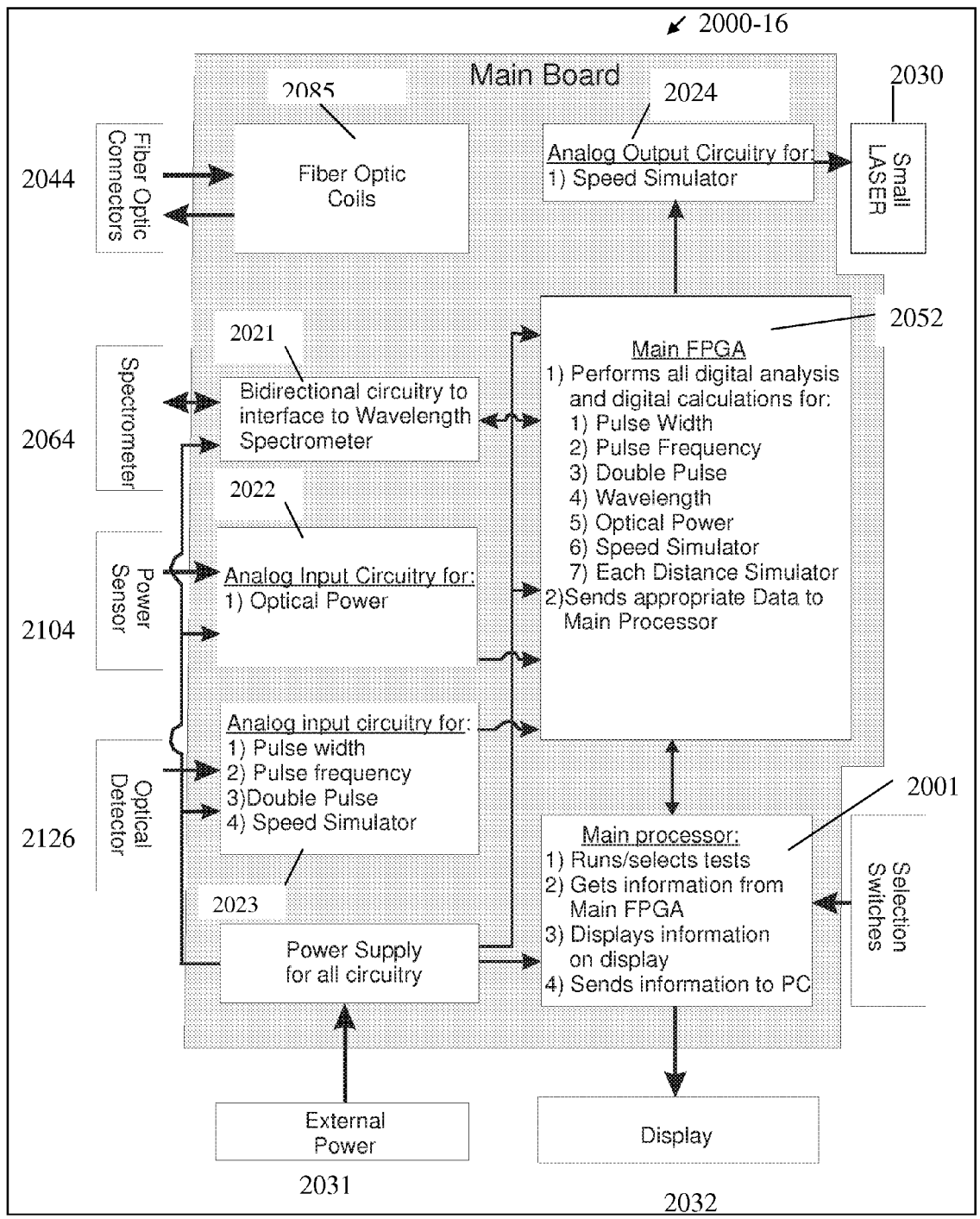
FIG. 20 is a block diagram that illustrates the functional components of an apparatus similar to that shown in FIG. 1, that is self-contained with regard to all of the speed gun tests performable by the apparatus, in contrast to an apparatus set-up to use modular, plug-and-play test heads, according to an embodiment of the invention.

Another embodiment of the invention is a self-contained, portable apparatus in which the circuitry enabling the various functions of the modular, plug-and-play test heads has been internalized; i.e., all circuitry required to enable the test and measurement of parameters required to provide certification of the laser gun(s) under test in various jurisdictions are contained within a self-contained, portable apparatus having size and weight characteristics that enable hand-held transport by the user. FIG. 20 shows a block schematic diagram of a main circuit board 2000-16 that contains thereon the necessary components and equivalent test head(s) circuitry to operate similarly to the way the modularized apparatus would operate as described above. For example, the components and circuitry shown in FIGS. 3$b$-3$g$ corresponding respectively to the pulse characterization test head, pulse wavelength test head, distance measurement test head, optical power measurement test head, speed simulation test head, internal clock frequency test head, as well as a power supply, display, laser, fiber optic coils, spectrometer, power sensor, optical detector, etc. are now all included on and/or interfaced to the main board 2000-16; e.g., fiber optic connector 2044, spectrometer 2064, power sensor 2104, optical detector 2126, external power supply 2031, display 2032, laser 2030, fiber optic coils 2085, bidirectional circuitry interface for spectrometer 2021, analog input circuitry for optical power test 2022, analog input circuitry for pulse width test, pulse frequency test, double pulse test and speed simulation test 2023, analog output circuitry for speed simulation test 2024 main FPGA 2052, which performs all digital analysis and digital calculations for pulse width, pulse frequency, double pulse, wavelength, optical power, speed simulation, long and short distance simulation, and which sends appropriate data to the main processor 2001, which selects and runs tests, gets information from the main FPGA 2052, controls the display of information on display 2032 and, sends information to the optional PC (not shown).

The use of the terms "a" and "an" and "the" and similar references in the context of describing the invention (especially in the context of the following claims) are to be construed to cover both the singular and the plural unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range unless otherwise indicated herein, and each separate value is incorporated into the specification as if it were individually recited herein.

All methods described herein can be performed in any suitable order unless otherwise indicated herein or otherwise clearly contradicted by context. The use of any and all examples or exemplary language (e.g., "such as") provided herein is intended merely to better illuminate embodiments of the invention and does not impose a limitation on the scope of the invention unless otherwise claimed. No language in the specification should be construed as indicating any non-claimed element as essential to the practice of the invention.

While the invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

I claim:

1. A self-contained, multi-function test and measurement apparatus used to test and measure the performance of a laser gun, comprising:
    internal control means for selecting and directing at least one of a plurality of selected test and measurement functions;
    means, operationally coupled to said internal control means, for measuring or verifying the capability of said laser gun to accurately measure at least two of the following: a double pulse; pulse frequency within a prescribed range of a designed pulse frequency; pulse width within a prescribed range of a designed pulse width; optical power within a prescribed maximum limit; actual wavelength within a prescribed range of a designed wavelength; speed simulation; and internal clock frequency;
    a housing including a certification unit containing the internal control means, said certification unit comprising:
        an integrated programmable display that provides a visual indicia of instructions or data or both to a user;
        a programmable control circuit including a plurality of functional blocks that provide control instructions for the apparatus, operationally coupled to the programmable display; and
        a plurality of integrated connectors that each provide a plug-and-play-type interface for a modular test head; and
    at least one modular, plug-and-play-type test head including a programmable test control circuit including a plurality of functional blocks that provide control operations of the test head,
    wherein the apparatus has at least one of an optical and an electrical interface that enables a respective operational connection with the laser gun, and further wherein the apparatus is self-contained and has size and weight characteristics that enable hand-held transport by the user.

2. The apparatus of claim 1, wherein the at least one modular, plug-and-play-type test head is an optical pulse characterization test head that enables a measurement of an optical pulse characteristic of the laser gun output being tested.

3. The apparatus of claim 2, wherein the optical pulse characteristic is pulse width.

4. The apparatus of claim 2, wherein the optical pulse characteristic is pulse frequency.

5. The apparatus of claim 2, wherein the optical pulse characteristic is a double-pulse condition.

6. The apparatus of claim 1, wherein the at least one modular, plug-and-play-type test head is an optical wavelength measurement test head that enables a measurement of an optical characteristic of the laser gun output being tested.

7. The apparatus of claim 6, wherein the optical characteristic is pulse wavelength.

8. The apparatus of claim 1, further comprising a coil of optical fiber having a known length, interfaced to the certification unit.

9. The apparatus of claim 8, wherein the at least one modular, plug-and-play-type test head is a distance measurement test head that enables a measurement of a distance calibration characteristic of the laser gun being tested.

10. The apparatus of claim 9, wherein the distance measurement test head is a short-range distance test head comprising a length of optical fiber.

11. The apparatus of claim 9, wherein the distance measurement test head is a long-range distance test head comprising a length of optical fiber.

12. The apparatus of claim 1, wherein the at least one modular, plug-and-play-type test head is an optical power measurement test head that enables a measurement of an optical power characteristic of the laser gun output being tested.

13. The apparatus of claim 1, wherein the at least one modular, plug-and-play-type test head is a speed simulation test head that enables a measurement of an object speed calibration characteristic of the laser gun being tested.

14. The apparatus of claim 1, wherein the at least one modular, plug-and-play-type test head is an internal clock frequency measurement test head that enables a measurement of an internal clock frequency characteristic of the laser gun being tested.

15. The apparatus of claim 1, further comprising a personal computer coupled to the certification unit.

16. A method for certifying the operation of a laser-gun-type speed measurement device, comprising:
    performing a 'pulse width' test of a laser, including the steps of:
        a) applying a first operating voltage to a laser gun of the laser-gun-type speed measurement device;
        b) directing an output of the laser gun into an optical detector;
        c) obtaining an output of the optical detector in the form of low-level current pulses;
        d) converting the low-level current pulses into a corresponding voltage;
        e) comparing the corresponding voltage to a reference voltage and determining whether an 'in-range' condition is present and, if yes;
        f) converting the low-level current pulses into high-level voltage pulses, wherein the high-level voltage pulses directly represent a pulse train output of the laser gun;
        g) providing a sampling circuit including eight parallel sampling paths that operate at phase differences which are successively 45 degrees apart, wherein each cycle of eight samples contains a series of '1' or '0' bits in an 8-bit data block that represent whether a pulse from the laser gun was present ('1') or not present ('0') at the time the sample was taken;
        h) accumulating 512 8-bit data blocks in a memory;
        i) counting the '1' bits in all 512 data blocks;
        j) using a known sample time to calculate an effective pulse width of the laser gun output;
        k) determining whether the calculated effective pulse width is within a specified range of a laser gun reference pulse width and, if no,
        l) concluding the test; otherwise,
        m) determining whether the 'pulse width' test is to be repeated at a different operating voltage and, if yes,
        n) applying at least a second operating voltage to the laser gun; and
        o) repeating steps (b-o) until the test has been performed at all selected operating voltages.

17. The method of claim 16, further comprising performing an 'optical power' test of a laser-gun-type speed measurement device.

18. The method of claim 16, further comprising performing a 'wavelength' test of a laser-gun-type speed measurement device.

19. The method of claim 16, further comprising performing a 'speed simulation' test of a laser-gun-type speed measurement device.

20. The method of claim 16, further comprising performing a 'horizontal beam width' test of a laser-gun-type speed measurement device.

21. The method of claim 16, further comprising performing a 'vertical beam width' test of a laser-gun-type speed measurement device.

22. The method of claim 16, further comprising performing a 'sight alignment' test of a laser-gun-type speed measurement device.

23. The method of claim 16, further comprising performing a 'double pulse' test, a 'pulse frequency' test, an 'optical power' test, a 'wavelength' test, a 'speed simulation' test, a 'horizontal beam width' test, a 'vertical beam width' test, and a 'sight alignment' test of a laser-gun-type speed measurement device.

24. A method for certifying the operation of a laser-gun-type speed measurement device, comprising:
performing a 'double pulse' test of a laser, including the steps of:
  a) applying a first operating voltage to a laser gun of the laser-gun-type speed measurement device;
  b) directing an output of the laser gun into an optical detector;
  c) obtaining an output of the optical detector in the form of low-level current pulses;
  d) converting the low-level current pulses into a corresponding voltage;
  e) comparing the corresponding voltage to a reference voltage and determining whether an 'in-range' condition is present and, if yes;
  f) converting the low-level current pulses into high-level voltage pulses, wherein the high-level voltage pulses directly represent a pulse train output of the laser gun;
  g) providing a sampling circuit including eight parallel sampling paths that operate at phase differences which are successively 45 degrees apart, wherein each cycle of eight samples contains a series of '1' or '0' bits in an 8-bit data block that represent whether a pulse from the laser gun was present ('1') or not present ('0') at the time the sample was taken;
  h) accumulating 512 8-bit data blocks in a memory;
  i) determining whether one or more '0' bits are found between two '1' bits and, if yes,
  j) concluding the test; otherwise,
  k) determining whether the 'double pulse' test is to be repeated at a different operating voltage and, if yes,
  l) applying at least a second operating voltage to the laser gun; and
  m) repeating steps (b-m) until the test has been performed at all selected operating voltages.

25. A method for certifying the operation of a laser-gun-type speed measurement device, comprising:
performing a 'pulse frequency' test of a laser, including the steps of:
  a) applying a first power supply voltage to a laser gun of the laser-gun-type speed measurement device;
  b) directing an output of the laser gun into an optical detector;
  c) obtaining an output of the optical detector in the form of low-level current pulses;
  d) converting the low-level current pulses into a corresponding voltage;
  e) comparing the corresponding voltage to a reference voltage and determining whether an 'in-range' condition is present and, if yes;
  f) converting the low-level current pulses into high-level voltage pulses, wherein the high-level voltage pulses directly represent a pulse train output of the laser gun;
  g) providing a sampling circuit including eight parallel sampling paths that operate at phase differences which are successively 45 degrees apart, wherein each cycle of eight samples contains a series of '1' or '0' bits in an 8-bit data block that represent whether a pulse from the laser gun was present ('1') or not present ('0') at the time the sample was taken;
  h) providing a sampling circuit that includes a flip-flop function that toggles from a "0" to a "1" state on every other pulse in the pulse train from the laser unit under test;
  i) providing a counter to accumulate the number of 400 MHz clock pulses that occur when the flip-flop is in the "1" state;
  j) transferring the value in the counter to a latch when the flip-flop returns to the "0" state, creating a locked value, and resetting the counter for a next cycle;
  k) using the locked value to determine the pulse period of the output of the laser unit under test by multiplying said latched value by the period of the 400 MHz clock and generating a measured pulse frequency value;
  l) determining whether the measured pulse frequency value is within a predetermined range of a specified pulse frequency value and, if no,
  m) concluding the test; otherwise,
  n) determining whether the 'pulse frequency' test is to be repeated at a different power supply voltage and, if yes,
  o) applying at least a second power supply voltage to the laser gun; and
  p) repeating steps (b-p) until the test has been performed at all selected power supply voltages.

* * * * *